US011350143B2

(12) United States Patent
Ram et al.

(10) Patent No.: US 11,350,143 B2
(45) Date of Patent: May 31, 2022

(54) CHARACTERIZING ATTRIBUTES OF USER DEVICES REQUESTING ENCODED CONTENT STREAMING

(71) Applicant: Amazon Technologies, Inc., Seattle, WA (US)

(72) Inventors: Varun Ram, Portland, OR (US); Ki Myung Han, Happy Valley, OR (US); Chris Price, Portland, OR (US); Meera Jindal, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/199,840

(22) Filed: Mar. 12, 2021

(65) Prior Publication Data

US 2021/0204004 A1 Jul. 1, 2021

Related U.S. Application Data

(63) Continuation of application No. 16/121,539, filed on Sep. 4, 2018, now Pat. No. 10,951,932.

(51) Int. Cl.
*H04N 7/173* (2011.01)
*H04N 21/236* (2011.01)
*H04N 21/858* (2011.01)
*H04N 21/234* (2011.01)

(52) U.S. Cl.
CPC ......... *H04N 21/236* (2013.01); *H04N 21/234* (2013.01); *H04N 21/8586* (2013.01)

(58) Field of Classification Search
CPC .............. H04N 21/236; H04N 21/234; H04N 21/8586; H04N 21/8456; H04N 21/251; H04N 21/2407; H04N 21/2343
See application file for complete search history.

(56) References Cited

U.S. PATENT DOCUMENTS

| | | | |
|---|---|---|---|
| 6,438,596 B1 | 8/2002 | Ueno et al. | |
| 7,703,116 B1 | 4/2010 | Moreau et al. | |
| 8,095,466 B2 | 1/2012 | Kahn et al. | |
| 8,239,888 B2 | 7/2012 | Todd | |
| 8,248,931 B2 | 8/2012 | Klein et al. | |
| 8,621,540 B2 | 12/2013 | Apsangi et al. | |
| 8,799,977 B1 | 8/2014 | Kapner et al. | |
| 8,813,117 B1 | 8/2014 | Inskip et al. | |
| 9,679,315 B2 | 6/2017 | Carasso | |
| 9,923,771 B2 | 3/2018 | Shah | |
| 9,936,229 B1 | 4/2018 | Wagenaar et al. | |
| 2004/0213214 A1 | 10/2004 | Jung et al. | |
| 2006/0230176 A1 | 10/2006 | Dacosta | |
| 2007/0107036 A1 | 5/2007 | Chen et al. | |
| 2007/0157228 A1 | 7/2007 | Bayer | |
| 2007/0157281 A1 | 7/2007 | Ellis et al. | |
| 2007/0204310 A1 | 8/2007 | Hua | |
| 2008/0069131 A1 | 3/2008 | Sakata et al. | |
| 2008/0081640 A1 | 4/2008 | Tran et al. | |

(Continued)

*Primary Examiner* — Michael B. Pierorazio

(74) *Attorney, Agent, or Firm* — Knobbe, Martens, Olson & Bear, LLP

(57) ABSTRACT

A video packaging and origination service can process requests for content segments from requesting user devices. The video packaging and origination service can utilize analytic rules and other information to characterize performance of the user device, such as detection of the presence of ad blocking software applications.

20 Claims, 12 Drawing Sheets

(56) References Cited

U.S. PATENT DOCUMENTS

| | | |
|---|---|---|
| 2008/0141303 A1 | 6/2008 | Walker et al. |
| 2008/0189735 A1 | 8/2008 | Barton et al. |
| 2008/0235733 A1 | 9/2008 | Heie et al. |
| 2009/0025025 A1 | 1/2009 | Vleck et al. |
| 2009/0037965 A1 | 2/2009 | Tsai |
| 2009/0079871 A1 | 3/2009 | Hua et al. |
| 2009/0082095 A1 | 3/2009 | Walker |
| 2009/0171749 A1 | 7/2009 | Laruelle et al. |
| 2009/0172757 A1 | 7/2009 | Aldrey et al. |
| 2009/0328115 A1 | 12/2009 | Malik |
| 2009/0328119 A1 | 12/2009 | Kan et al. |
| 2010/0036962 A1 | 2/2010 | Gahm et al. |
| 2010/0058061 A1 | 3/2010 | Folta et al. |
| 2010/0287580 A1 | 11/2010 | Harding et al. |
| 2011/0026470 A1 | 2/2011 | Joo et al. |
| 2011/0055866 A1 | 3/2011 | Piepenbrink et al. |
| 2011/0078717 A1 | 3/2011 | Drummond et al. |
| 2011/0088053 A1 | 4/2011 | Lee |
| 2011/0110515 A1 | 5/2011 | Tidwell et al. |
| 2011/0112909 A1 | 5/2011 | Singh et al. |
| 2011/0179356 A1 | 7/2011 | Bassali et al. |
| 2011/0191397 A1 | 8/2011 | Dazzi et al. |
| 2011/0191445 A1 | 8/2011 | Dazzi |
| 2011/0191446 A1 | 8/2011 | Dazzi et al. |
| 2011/0296473 A1 | 12/2011 | Babic |
| 2012/0023523 A1 | 1/2012 | Rajan et al. |
| 2012/0047535 A1 | 2/2012 | Bennett et al. |
| 2012/0066267 A1 | 3/2012 | Hays et al. |
| 2012/0124618 A1 | 5/2012 | Ruiz-Velasco et al. |
| 2012/0209961 A1 | 8/2012 | McCoy et al. |
| 2012/0242900 A1 | 9/2012 | Huang et al. |
| 2012/0284756 A1 | 11/2012 | Kotecha et al. |
| 2013/0073388 A1 | 3/2013 | Heath |
| 2013/0104173 A1 | 4/2013 | Tijo et al. |
| 2013/0111509 A1 | 5/2013 | Guo |
| 2013/0198770 A1 | 8/2013 | Xiong et al. |
| 2013/0219449 A1 | 8/2013 | Muvavariwa et al. |
| 2013/0227618 A1 | 8/2013 | Jung et al. |
| 2014/0156363 A1 | 6/2014 | Hsu |
| 2014/0196079 A1* | 7/2014 | Jannard ................ H04L 9/0825 725/31 |
| 2014/0317653 A1 | 10/2014 | Mlodzinski |
| 2015/0067722 A1 | 3/2015 | Bjordammen et al. |
| 2015/0095461 A1 | 4/2015 | McGowan et al. |
| 2015/0208103 A1 | 7/2015 | Guntur |
| 2015/0229980 A1 | 8/2015 | Reisner |
| 2015/0356612 A1 | 12/2015 | Mays et al. |
| 2016/0037232 A1 | 2/2016 | Hu |
| 2016/0156977 A1* | 6/2016 | Haverkamp Begemann ............... H04N 9/87 725/11 |
| 2016/0173943 A1* | 6/2016 | Roberts ............. H04N 21/6125 725/110 |
| 2016/0182941 A1 | 6/2016 | Crabtree |
| 2016/0205443 A1 | 7/2016 | Ghadi |
| 2016/0300537 A1 | 10/2016 | Hoffman et al. |
| 2016/0337691 A1 | 11/2016 | Prasad et al. |
| 2016/0366202 A1 | 12/2016 | Phillips et al. |
| 2017/0171578 A1 | 6/2017 | Joong et al. |
| 2017/0272835 A1 | 9/2017 | Osanai |
| 2017/0337600 A1 | 11/2017 | Karanth et al. |
| 2017/0339114 A1 | 11/2017 | Watson et al. |
| 2018/0084291 A1 | 3/2018 | Wei et al. |
| 2018/0160196 A1 | 6/2018 | Wahl |
| 2018/0192158 A1 | 7/2018 | Smith et al. |
| 2018/0352307 A1 | 12/2018 | Giladi et al. |
| 2019/0034528 A1 | 1/2019 | Lintz |
| 2019/0174156 A1 | 6/2019 | Crawford |
| 2019/0246152 A1 | 8/2019 | Zuydervelt et al. |
| 2019/0273967 A1 | 9/2019 | Besehanic |
| 2019/0313135 A1 | 10/2019 | Pathak et al. |
| 2020/0311992 A1 | 10/2020 | Sen et al. |

* cited by examiner

CHARACTERIZING ATTRIBUTES OF USER DEVICES REQUESTING ENCODED CONTENT STREAMING

CROSS-REFERENCE TO RELATED APPLICATIONS

This application is a continuation of U.S. patent application Ser. No. 16/121,539, titled "CHARACTERIZING ATTRIBUTES OF USER DEVICES REQUESTING ENCODED CONTENT STREAMING" and filed on Sep. 4, 2018, the entirety of which is incorporated herein by reference.

BACKGROUND

Generally described, computing devices and communication networks can be utilized to exchange data and/or information. In a common application, a computing device can request content from another computing device via the communication network. For example, a user at a personal computing device can utilize a browser application to request a content page (e.g., a network page, a Web page, etc.) from a server computing device via the network (e.g., the Internet). In such embodiments, the user computing device can be referred to as a client computing device and the server computing device can be referred to as a content provider.

Content providers provide requested content to client computing devices often with consideration of image quality and performance delivery of the requested content as reconstructed at the client computing device.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
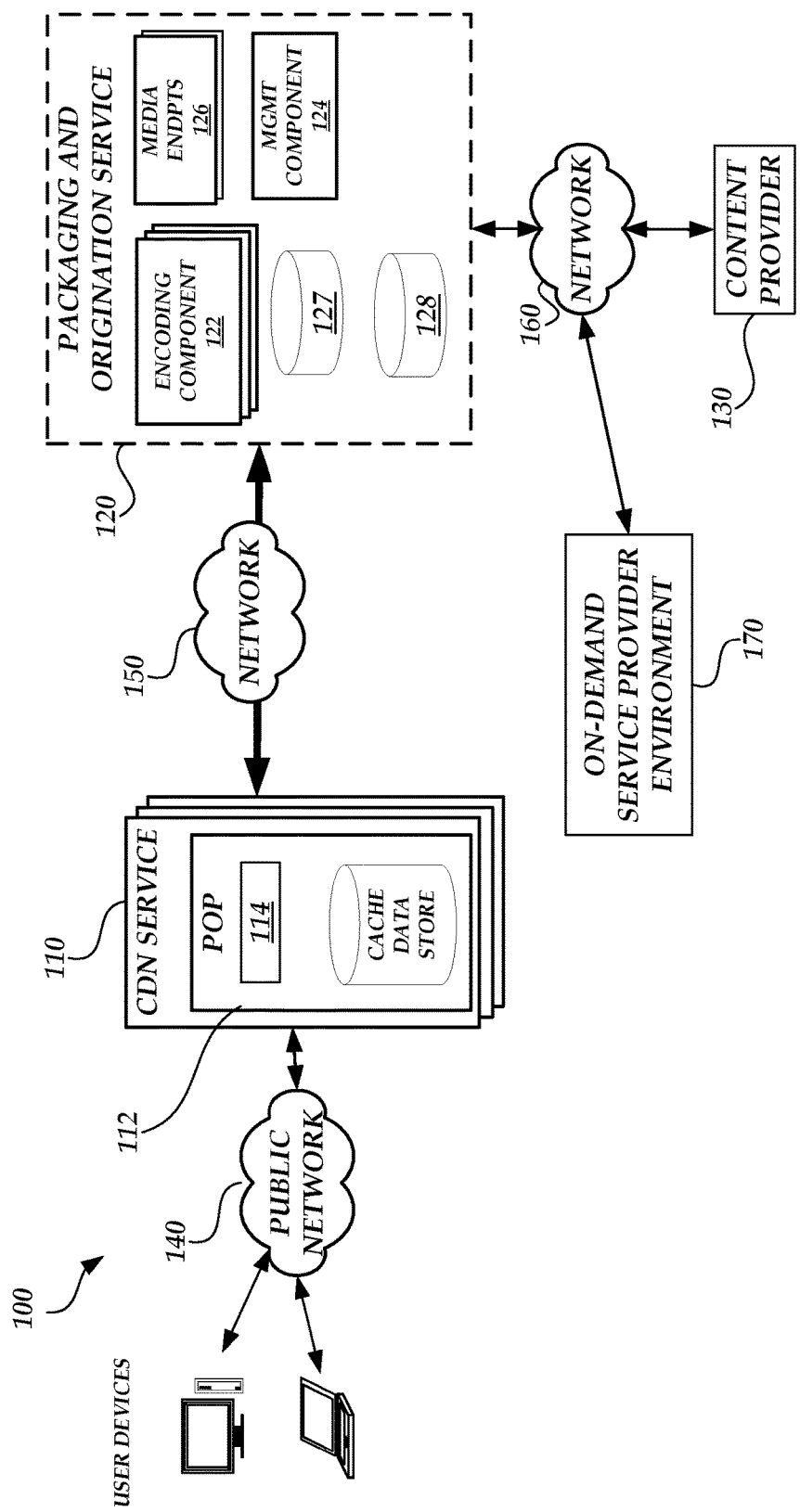
FIG. 1 is a block diagram of a content delivery environment that includes one or more client devices, one or more edge locations, a video packaging system, a content provider and an on-demand service provider in accordance with some embodiments.

Generally described, content providers can provide content to requesting users. With regard to video content, a content provider can implement a video packaging and origination service that is able to deliver video content to requesting users. Still further, the content provider or packaging and origination service can utilize a CDN or other content delivery component to deliver video content to requesting users or client computing devices utilizing streaming transmissions in accordance with one of a range of communication protocols, such as the hypertext transfer protocol ("HTTP").

Content providers can organize requested content, such as a video file, into multiple segments that are then transmitted to requesting devices segment by segment. For example, in a video stream, each segmented portion typically accounts for 2-10 seconds of video rendered on a receiving device. Each video segment can be encoded by a video packaging and origination service according to an encoding format utilized by the encoder to generate the output stream. The encoding format can correspond to a content representation format for storage or transmission of video content (such as in a data file or bitstream). Examples of encoding formats include but not limited to the motion pictures expert group ("MPEG) MPEG-2 Part 2, MPEG-4 Part 2, H.264 (MPEG-4 Part 10), H.265 high efficiency video coding ("HEVC"), Theora, RealVideo RV40, VP9, and AOMedia Video 1 ("AV1"), and the like.

In some scenarios, a video packaging and origination service can distribute encoded content to different user devices or other recipients based on different financial models related to the quality of the encoded content or the inclusion/exclusion of additional encoded content. As applied to encoding content, a video packaging and origination service can set up a set of media endpoints to service user devices that request content. Respective media endpoints can package and provide encoded segments to requesting users. In some embodiments, the video packaging and origination service can include additional content, such as advertisements or associated content, that is delivered as part of a requested content stream.

With regard to live streaming of encoded content, a video packaging and origination service can associate various processing rules or processing restrictions to the set of media endpoints corresponding to how content streams are processed by requesting user devices. For example, a content provider associated with streaming content transmission may impose restrictions that prohibit the use of software applications or code that attempt to bypass advertisement content, often referred to as "ad blockers" or "anti-ad applications." In another example, a content provider may wish to verify whether a user device has modified attributes of a media application rendering streaming content or the computing device, such as muting sound volumes during the playback of supplemental content or streaming content. In still another example, a content provider may wish to verify that streamed content is continuously rendered at the user device or whether the user is interacting with the rendered content, especially in situations in which the content is associated or otherwise characterized as time sensitive.

To evaluate processing rules or restrictions, video packaging and origination services typically require some form of information from the receiving user devices regarding how received content streams are processed. For example, a media player application may be configured to determine whether ad blocker code is being executed on the device. In another example, the media player application may be configured to record and transmit various user interactions, such as volume levels, user selections of selectable objects or controls in the media player applications (e.g., links or playback controls), or other information regarding individual user interaction with the user device. Based on the information provided by the various user devices, the video packaging and origination service can at least partially evaluate processing rules or processing restrictions.

Reliance on information from user devices, such as media player applications, can be inefficient or ineffective. For example, differences can often occur in terms of how individual media player applications collect and transmit information (e.g., similar user behavior may be reported differently depending on the reporting software application). In another example, the video packaging and origination service is required to be reliant on the veracity of the information provided by a media player application, which can be subject to manipulation or altered configurations. Still further, although some media player applications may be able to detect the presence of anti-ad applications or software, typical media player applications are not able to either mitigate the effect of a set of identified applications or modify the streaming of content in view of measured user behavior. In some embodiments, media player applications may be configured with anti-ad functionality as part of the operation of the media player application.

To address at least in part some of the above-described deficiencies associated with traditional encoded content distribution and management techniques, aspects of the present application correspond to a method and system for managing encoded content segments. More specifically, a video packaging and origination service includes one or more encoders that are configured to encode content according to an encoding profile. Illustratively, the encoders encode the content into a plurality of segments. The encoded content segments can be then transmitted from the encoder to a data store or other storage location and made available to for one or more media endpoints, such as a packager.

As part of the receipt of requests for encoded content, the video packaging and origination service generates or calculates information characterizing one or more attributes related to the receipt of encoded content streams by receiving user devices. More specifically, in conjunction with state data maintained by the video packaging and origination service, the video packaging and origination service can in one aspect associate viewership or user activity based on interaction with the user device requesting encoded content. In an illustrative example, the video packaging and origination service identifies available streaming content segments in a manifest that is organized in accordance with a sequence of content segments. As requests for encoded content segments identified in the manifest are received from user devices, the video packaging and origination service can estimate a consumption rate for the streaming content. The estimated consumption rate can be utilized to identify whether the user device has paused the playback of the streaming content or is likely attempting to skip one or more content stream segments, such as advertisement content. In another example, embedded content streams can include links or resource identifiers associated with third parties that facilitate additional action, such as accessing a Web site. Illustratively, the content streams can be configured with links or resource identifiers that cause a selection of the link to be received by the video packaging and origination service to record the selection and then be directed to an intended third party source. The selection recordation can be used to identify whether a user is actively interacting with a media player application (or other software application) or areas of focus for user interaction.

In still another example, the video packaging and origination service can access additional device data or receive additional inputs from computing devices associated with a requesting user. For example, a mobile device or home device may be configured to record volume levels at defined times. Utilizing such information, the video packaging and origination service can attribute volume levels, user interaction or other characteristics with the rendering of content streams. In another example, a camera may be utilized to measure color levels or screen activity at defined times. Utilizing such information, the video packaging and origination service can attribute whether the streaming content is actively being displayed on a user device. Still further, social media applications may provide information related to content that can attempt to match keywords or other information that can be attributed to supplemental content, such as advertisements. In this example, reference to keywords associated with advertisement content can be utilized to verify compliance with processing rules or verify that the supplemental content has been rendered on a user device.

With regard to the illustrative examples, as well as other embodiments of the present application, the video packaging and origination service can receive the inputs from the media application without requiring additional monitoring or reporting information regarding behavior. In some embodiments, the video packaging and origination service can utilize the absence of receipt of requests from a user device to generate consumption rates and characterize performance of the user device (e.g., a paused content stream or attempting to skip advertisement content). Additionally, because the video packaging and origination service can make the determinations from encoded content segment requests or selection of links, issues related to differences in reporting or questions of veracity can be mitigated.

In addition to receiving the content to be encoded, the video packaging and origination service can be configured to dynamically modify how encoded content, such as content segments, are transmitted to the user computing device. More specifically, in one embodiment, the video packaging and origination service can utilize one of a variety of techniques to impact how anti-ad or ad-blocking applications perform on the user devices. In one embodiment, the video packaging and origination service can modify personal time stamps or other sequential information that are utilized to identify the sequence of encoded content segments to the user device. By modifying traditional sequential information, such as inserting discontinuity in the sequence of segments, the video packaging and origination service can make identification of advertisement content or supplemental content more difficult for the user computing device. In another embodiment, the video packaging and origination service can modify naming information for the segments to mitigate utilizing naming information to identify advertisement or supplement content. Still further, in another embodiment, the video packaging and origination service can utilize encryption such the user computing devices cannot readily identify naming information for individual segments, except in an encrypted form. The various techniques for modifying or obfuscating naming information prevents or mitigates the ability for anti-ad applications from identifying content segment corresponding to advertisement content by name and block the rendering of such identified content segments.

Illustratively, aspects of the present application may utilize the execution of execution of portable segments of code, which can be generally referred to as "on-demand code" or "tasks." For example, the video packaging and origination service may utilize on-demand code to customize content manifests or receive/process inputs from additional data sources. In another example, the video packaging and origination service may utilize on-demand code to customize content manifests or receive/process encoded content segments to implement as at least a portion of the techniques described herein. The server provider environment may include an on-demand code execution environment that functions to execute the on-demand code or tasks. Further details regarding such an on-demand code execution environment can be found within U.S. patent application Ser. No. 14/502,648, entitled PROGRAMMATIC EVENT DETECTION AND MESSAGE GENERATION FOR REQUESTS TO EXECUTE PROGRAM CODE, filed Sep. 30, 2014, and issued as U.S. Pat. No. 9,323,556 on Apr. 26, 2016 ("the '556 Patent), the entirety of which is hereby incorporated by reference.

In brief, to execute tasks, an on-demand code execution environment may maintain a pool of pre-initialized virtual machine instances that are ready for use as soon as a user request is received. Due to the pre-initialized nature of these virtual machines, delay (sometimes referred to as latency) associated with executing the user code (e.g., instance and language runtime startup time) can be significantly reduced, often to sub-100 millisecond levels.

Illustratively, the on-demand code execution environment may maintain a pool of virtual machine instances on one or more physical computing devices, where each virtual machine instance has one or more software components (e.g., operating systems, language runtimes, libraries, etc.) loaded thereon. When the on-demand code execution environment receives a request to execute the program code of a user (a "task"), which specifies one or more computing constraints for executing the program code of the user, the on-demand code execution environment may select a virtual machine instance for executing the program code of the user based on the one or more computing constraints specified by the request and cause the program code of the user to be executed on the selected virtual machine instance. The program codes can be executed in isolated containers that are created on the virtual machine instances. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) is significantly reduced.

The on-demand code execution environment may include a virtual machine instance manager, as described in more detail in the '556 Patent, that is configured to receive user code (threads, programs, etc., composed in any of a variety of programming languages) and execute the code in a highly scalable, low latency manner, without requiring user configuration of a virtual machine instance. Specifically, the virtual machine instance manager can, prior to receiving the user code and prior to receiving any information from a user regarding any particular virtual machine instance configuration, create and configure virtual machine instances according to a predetermined set of configurations, each corresponding to any one or more of a variety of run-time environments. Thereafter, the virtual machine instance manager receives user-initiated requests to execute code, and identifies a pre-configured virtual machine instance to execute the code based on configuration information associated with the request. The virtual machine instance manager can further allocate the identified virtual machine instance to execute the user's code at least partly by creating and configuring containers inside the allocated virtual machine instance. Various embodiments for implementing a virtual machine instance manager and executing user code on virtual machine instances is described in more detail in the '556 Patent.

In accordance with one or more aspects of the present application, the video packaging and origination service can continue to leverage the benefit of execution of on-demand code and an on-demand code service provider. However, in other embodiments, the video packaging and origination service can utilize additional or alternative executable code that is described above with regard to functionality associated with the on-demand code. Additionally, based aspects of the present application, the video packaging and origination service will be described as facilitating various applications or examples for modifying the distribution of encoded content segments. Such examples are illustrative in nature and should be construed as limiting or exhaustive of all possible applications of one or more aspects of the present application.

FIG. 1 illustrates a general content delivery environment 100 for delivering content from original content providers to user devices. The content delivery environment 100 includes a plurality of devices 102 utilized by individual users, generally referred to as user computing devices, to request streaming or download content from a video packaging and origination service 120. Illustratively, the video packaging and origination service 120 indexes a collection of source video content (either live streaming or file-based video-on-demand) and delivers it to clients via a wide range of communication protocols such as HTTP Live Streaming ("HLS"), Dynamic Adaptive Streaming over HTTP ("DASH"), HTTP Dynamic Streaming ("HDS"), Real Time Messaging Protocol ("RTMP"), Smooth Streaming, and the like. Based on consumer demand, a video packaging and origination service 120 can also provide advanced video transmission features such as just-in-time packaging of video content, digital rights management ("DRM") encryption, time-shifting, bitrate selection, catch up TV, and more. The content can be illustratively provided by one or more origin sources, such as original content provider 130.

User computing devices 102 may include any number of different computing devices capable of communicating with the networks 140, 150, 160, via a direct connection or via an intermediary. For example, individual accessing computing devices may correspond to a laptop or tablet computer, personal computer, wearable computer, server, personal digital assistant ("PDA"), hybrid PDA/mobile phone, mobile phone, electronic book reader, set-top box, camera, appliance (e.g., a thermostat or refrigerator), controller, digital media player, watch, eyewear, a home or car device, Internet of Things ("IoT") devices, virtual reality or augmented reality devices, and the like. Each user computing device 102 may optionally include one or more data stores (not shown in FIG. 1) including various applications or computer-executable instructions, such as web browsers, used to implement the embodiments disclosed herein. As will be described in greater detail below, the user computing devices 102 may in some embodiments one or more additional software applications that can attempt, at least in part, to block portions of streamed content, such as advertisements. Illustrative components of a user computing device 102 will be described with regard to FIG. 2.

In some embodiments, a CDN service provider 110 may include multiple edge locations from which a user device can retrieve content. Individual edge location 112 may be referred to herein as a point of presence ("POP"), where a POP 112 is intended to refer to any collection of related computing devices utilized to implement functionality on behalf of one or many providers. POPs are generally associated with a specific geographic location in which the computing devices implementing the POP are located, or with a region serviced by the POP. As illustrated in FIG. 1, the POP 112 can include one or more processing components 114 for processing information for managing content provided by the video packaging and origination service 120. The POP 112 can further include a data store 116 for maintaining collected information. For example, a data center or a collection of computing devices within a data center may form a POP. In some instances, the POPs may implement one or more services, such as CDN services, data storage services, data processing services, etc. The CDN service provider 110 may include multiple POPs located in different geographic locations so that user devices can communicate with a nearby a POP to retrieve content, thereby reducing the latency of delivering requested content.

Networks 140, 150, 160 may be any wired network, wireless network, or combination thereof. In addition, the networks 140, 150, 160 may be a personal area network, local area network, wide area network, cable network, fiber network, satellite network, cellular telephone network, data network or combination thereof. In the example environment of FIG. 1, network 140 is a global area network ("GAN"), such as the Internet. Protocols and components for communicating via the other aforementioned types of communication networks are well known to those skilled in the art of computer communications and thus, need not be described in more detail herein. While each of the client computing devices 102 and CDN service provider 110 are depicted as having a single connection to the network 140, individual components of the client computing devices 102 and CDN service provider 110 may be connected to the network 140 at disparate points. Accordingly, communication times and capabilities may vary between the components of FIG. 1. Likewise, although FIG. 1 is illustrated as having three separate networks 140, 150, 160, one skilled in the relevant art will appreciate that the video packaging and origination service 120 may utilize any number or combination of networks.

The content delivery environment 100 can include a plurality of content providers 130 for delivering input signals to the video packaging and origination service 120. The content providers may include one or more servers for delivering content, a data store for maintaining content and a communication manager for facilitating communications to the video packaging and origination service 120 over network° 160. In other embodiments, the content provider 130 can further user devices 120 that are generating live video feeds for transmission by the video packaging and origination service 120. As will be described in detail below, illustratively, the content provider 130 can include or provide multiple, distinct input signals to the video packaging and origination service 120. Additionally, as described above, the content providers 130 can provide distribution information to the video packaging and origination service 120, such as via an API. The content delivery environment 100 can further include an on-demand service provider environment 170 for facilitating the execution of on-demand code or tasks, as will be described in greater detail below. For purposes of illustration, the content delivery environment 100 can include one or more additional data sources for providing additional data, such as home devices, cameras, social media services, and the like.

In accordance with embodiments, the video packaging and origination service 120 includes a set of encoding components 122 for receiving content provided by the content providers 130 (or other source) and processing the content to generate a set of encoded video segments available for delivery. The video packaging and origination service 120 is further optionally associated with a management component 124 to facilitate the determination of distribution of encoded content segments. The management component 124 can delegate at least some portion of the identified functionality to the encoder components themselves, such as the determination or negotiation of the handover or stop events.

The video packaging and origination service 120 can include a plurality of media endpoints 126. Illustratively, the media endpoints 126 can implement functionality associated with packaging and delivery of encoded content segments to user devices 120. Individual media endpoints 126 may be associated with defined geographic or logic areas serviced by the video packaging and origination service 120 and may implemented on different physical computing devices. Illustratively, the video packaging and origination service 120 can vary the distribution of encoded content segments by dynamically modifying how content manifests identifying individual encoded content segments are generated and transmitted to a set of media endpoints 126. For example, in some embodiments, the video packaging and origination service 120 can generate different forms of content manifests for encoded media streams based on operational parameters for user computing devices, such as whether a user device is associated with a software application attempting to block content. In another example, the video packaging and origination service 120 can dynamically modify the processing of the content manifests based on a determined performance or performance indicators associated with the user devices 102, such as a characterized effectiveness of anti-ad blocking mitigation techniques.

The video packaging and origination service 120 can further include multiple data stores of maintaining encoded content segments, distribution information, state data, or other information utilized in accordance with one or more aspects of the present application or otherwise utilized in the generation of encoded content. Illustratively, the video packaging and origination service 120 includes a data store 127 for receiving and maintaining encoded content segments from the one or more encoders 122. The video packaging and origination service 120 further includes a data store 128 for receiving and maintain distribution information, such as a database in which distribution information for encoded content segments is represented in one or more individual database records. The data store 128 can be further utilized for maintaining information regarding server-side collection statistics, including state data or other information previously measured.

It will be appreciated by those skilled in the art that the video packaging and origination service 120 may have fewer or greater components than are illustrated in FIG. 1. Thus, the depiction of the video packaging and origination service 120 in FIG. 1 should be taken as illustrative. For example, in some embodiments, components of the video packaging and origination service 120 may be executed by one more virtual machines implemented in a hosted computing environment. A hosted computing environment may include one or more rapidly provisioned and released computing resources, which computing resources may include computing, networking or storage devices. Additionally, the data stores 127 and 128 may be implemented in a distributed manner that encompasses multiple computing devices geographically or logically distinct. Still further, in some embodiments, the video packaging and origination service 120 may omit a portion, or all, of the functionality associated with interaction service provider environment 170 such as by maintaining executable code or components configured to implement at least a portion of such functionality.

Figure 2:
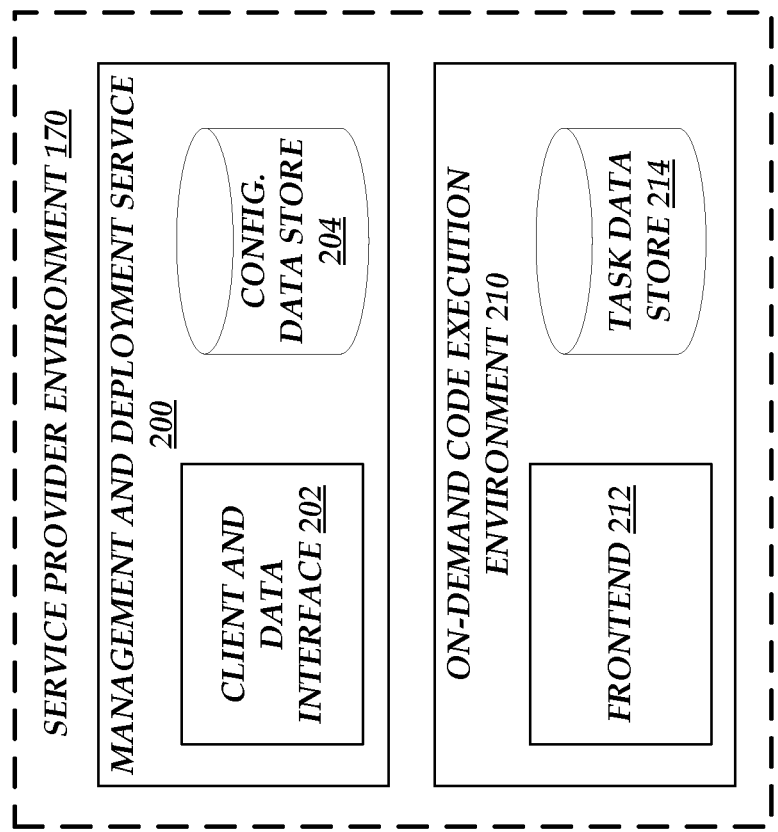
FIG. 2 is a block diagram of illustrative of components of a service provider environment for executing on-demand code in accordance with some embodiments.

Turning now to FIG. 2, an illustrative service provider environment 170 for the execution of on-demand code or tasks will be described. By way of illustrative example, the video packaging and origination service 120 may utilize on-demand code to generate different forms of content streams based on the detected presence of ad blocking software applications. The service provider environment 170 can include a number of elements to enable configuration of, management of, and communications with the video packaging and origination service 120. Specifically, the service provider environment 170 includes a management and deployment service 200 to enable interaction with the video packaging and origination service 120, and an on-demand code execution environment 210 providing on-demand, dynamic execution of tasks.

As shown in FIG. 2, the management and deployment service 200 includes a client and data interface 202 and a configuration data store 204 that may operate collectively to enable registration of the video packaging and origination service 120. Illustratively, the client and data interface 202 may provide one or more user interfaces (e.g., APIs, CLIs, GUIs, etc.) through which the video packaging and origination service 120, may generate or submit a configuration of on-demand executable code as described herein. The configuration data store 204 can correspond to any persistent or substantially persistent data store, such as a hard drive (HDD), a solid state drive (SDD), network attached storage (NAS), a tape drive, or any combination thereof.

In some embodiments, the on-demand code execution environment 170 may include multiple edge locations from which a user device can retrieve content. Individual edge locations may be implemented in one or more POPs. As described with regard to the CDN service provider, POPs are generally associated with a specific geographic location in which the computing devices implementing the POP are located, or with a region serviced by the POP. Illustratively, individual POPs can include one or more information processing components for providing on-demand execution of tasks (e.g., portable code segments). In some instances, the POPs may implement one or more services, such as CDN services, data storage services, data processing services, etc. The CDN service provider 110 may include multiple POPs located in different geographic locations so that components of the video packaging and origination service 120 can communicate with a logically proximate POP to transmit requests for authentication and authorization and receive processing results.

The on-demand code execution environment 210 can include a number of devices providing on-demand execution of tasks (e.g., portable code segments). Specifically, the on-demand code execution environment 210 can include a frontend 212, through which computing devices, may submit tasks to the on-demand code execution environment 210 and call for execution of tasks on the on-demand code execution environment 210. Such tasks may be stored, for example, in a task data store 214, which can correspond to any persistent or substantially persistent data store, such as a hard drive (HDD), a solid state drive (SDD), network attached storage (NAS), a tape drive, or any combination thereof. While not shown in FIG. 2, the on-demand code execution system 210 can include a variety of additional components to enable execution of tasks, such as a number of execution environments (e.g., containers or virtual machines executing on physical host devices of the on-demand code execution environment 210), a worker manager to manage such execution environments, and a warming pool manager to assist in making execution environments available to the worker manager on a rapid basis (e.g., under 10 ms). Further details regarding the on-demand code execution environment can be found within the '556 Patent, incorporated by reference above.

As noted above, tasks correspond to individual collections of user code (e.g., to achieve a specific function). References to user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular web application or mobile application developed by the user. Specific executions of that code are referred to herein as "task executions" or simply "executions." Tasks may be written, by way of non-limiting example, in JavaScript (e.g., node.js), Java, Python, and/or Ruby (and/or another programming language). Tasks may be "triggered" for execution on the on-demand code execution system 210 in a variety of manners. In one embodiment, a computing device may transmit a request to execute a task may, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of a coordinator 114, a network-accessible storage service, or the task data store 214) prior to the request being received by the on-demand code execution system 150. A request interface of the on-demand code execution system 210 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface of the frontend 212.

A call to execute a task may specify one or more third-party libraries (including native libraries) to be used along with the user code corresponding to the task. In one embodiment, the call may provide to the on-demand code execution system 210 a ZIP file containing the user code and any libraries (and/or identifications of storage locations thereof) corresponding to the task requested for execution. In some embodiments, the call includes metadata that indicates the program code of the task to be executed, the language in which the program code is written, the user associated with the call, and/or the computing resources (e.g., memory, etc.) to be reserved for executing the program code. For example, the program code of a task may be provided with the call, previously uploaded by the user, provided by the on-demand code execution system 210 (e.g., standard routines), and/or provided by third parties. In some embodiments, such resource-level constraints (e.g., how much memory is to be allocated for executing a particular user code) are specified for the particular task, and may not vary over each execution of the task. In such cases, the on-demand code execution system 210 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the on-demand code execution system 210 to access private resources (e.g., on a private network).

In some embodiments, a call may specify the behavior that should be adopted for handling the call. In such embodiments, the call may include an indicator for enabling one or more execution modes in which to execute the task referenced in the call. For example, the call may include a flag or a header for indicating whether the task should be executed in a debug mode in which the debugging and/or logging output that may be generated in connection with the execution of the task is provided back to the user (e.g., via a console user interface). In such an example, the on-demand code execution system 210 may inspect the call and look for the flag or the header, and if it is present, the on-demand code execution system 210 may modify the behavior (e.g., logging facilities) of the execution environment in which the task is executed, and cause the output data to be provided back to the user. In some embodiments, the behavior/mode indicators are added to the call by the user interface provided to the user by the on-demand code execution system 210. Other features such as source code profiling, remote debugging, etc., may also be enabled or disabled based on the indication provided in a call.

Figure 3:
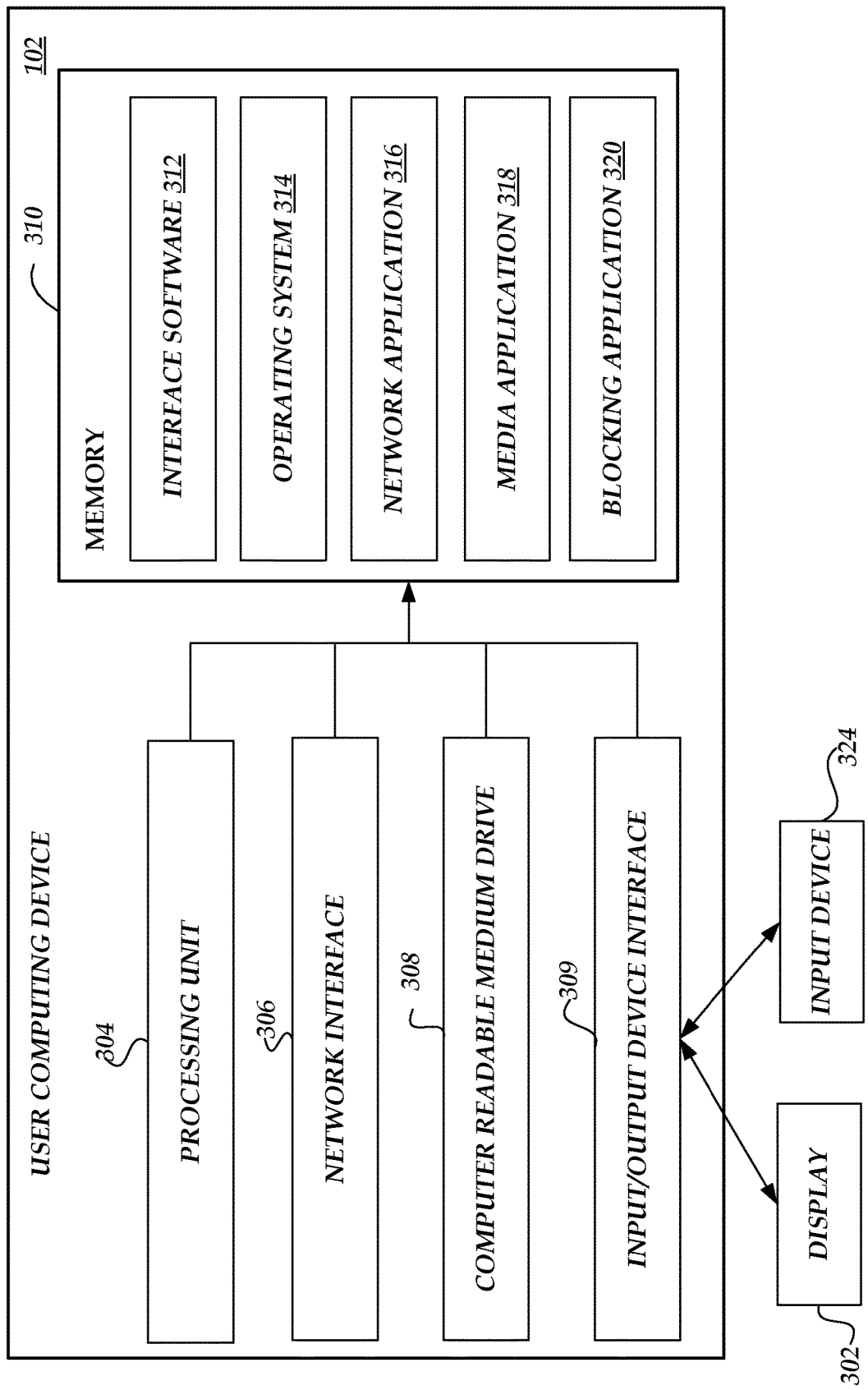
FIG. 3 is a block diagram illustrative of components of user device for requesting and receiving encoded content in accordance with some embodiments.

FIG. 3 depicts one embodiment of an architecture of an illustrative user computing device 102 that can generate content requests and process metric information in accordance with the present application. The general architecture of the user computing device 102 depicted in FIG. 3 includes an arrangement of computer hardware and software components that may be used to implement aspects of the present disclosure. As illustrated, the user computing device 102 includes a processing unit 304, a network interface 306, an input/output device interface 309, an optional display 302, and an input device 324, all of which may communicate with one another by way of a communication bus.

The network interface 306 may provide connectivity to one or more networks or computing systems, such as the network 140 of FIG. 1 and the video packaging and origination service 120 or the content provider 130. The processing unit 304 may thus receive information and instructions from other computing systems or services via a network. The processing unit 304 may also communicate to and from memory 310 and further provide output information for an optional display 302 via the input/output device interface 309. The input/output device interface 309 may also accept input from the optional input device 324, such as a keyboard, mouse, digital pen, etc. In some embodiments, the user computing device 102 may include more (or fewer) components than those shown in FIG. 3.

The memory 310 may include computer program instructions that the processing unit 304 executes in order to implement one or more embodiments. The memory 310 generally includes RAM, ROM, or other persistent or non-transitory memory. The memory 310 may store an operating system 314 that provides computer program instructions for use by the processing unit 304 in the general administration and operation of the user computing device 102. The memory 310 may further include computer program instructions and other information for implementing aspects of the present disclosure. For example, in one embodiment, the memory 310 includes interface software 312 for requesting and receiving content from the video packaging and origination service 120 via the CDN service provider 110. In another example, in one embodiment, the memory 310 includes a specific media player application for accessing content, decoding the encoded content, and communicating with the CDN service provider 110. In some embodiments, the memory 310 may include one or more additional software applications or components that are configured, at least in part, to assist in the blocking or skipping of portions of received content. Specifically, in some embodiments, the memory 310 may include a blocking application 320 configured to block content, such as advertisement content included in the content streams from the video origination and packaging service 120. In other embodiments, the network application 316 or media application 318 may be configured with additional executable code or components configured to implement similar functionality to the blocking application 320.

Figure 4:
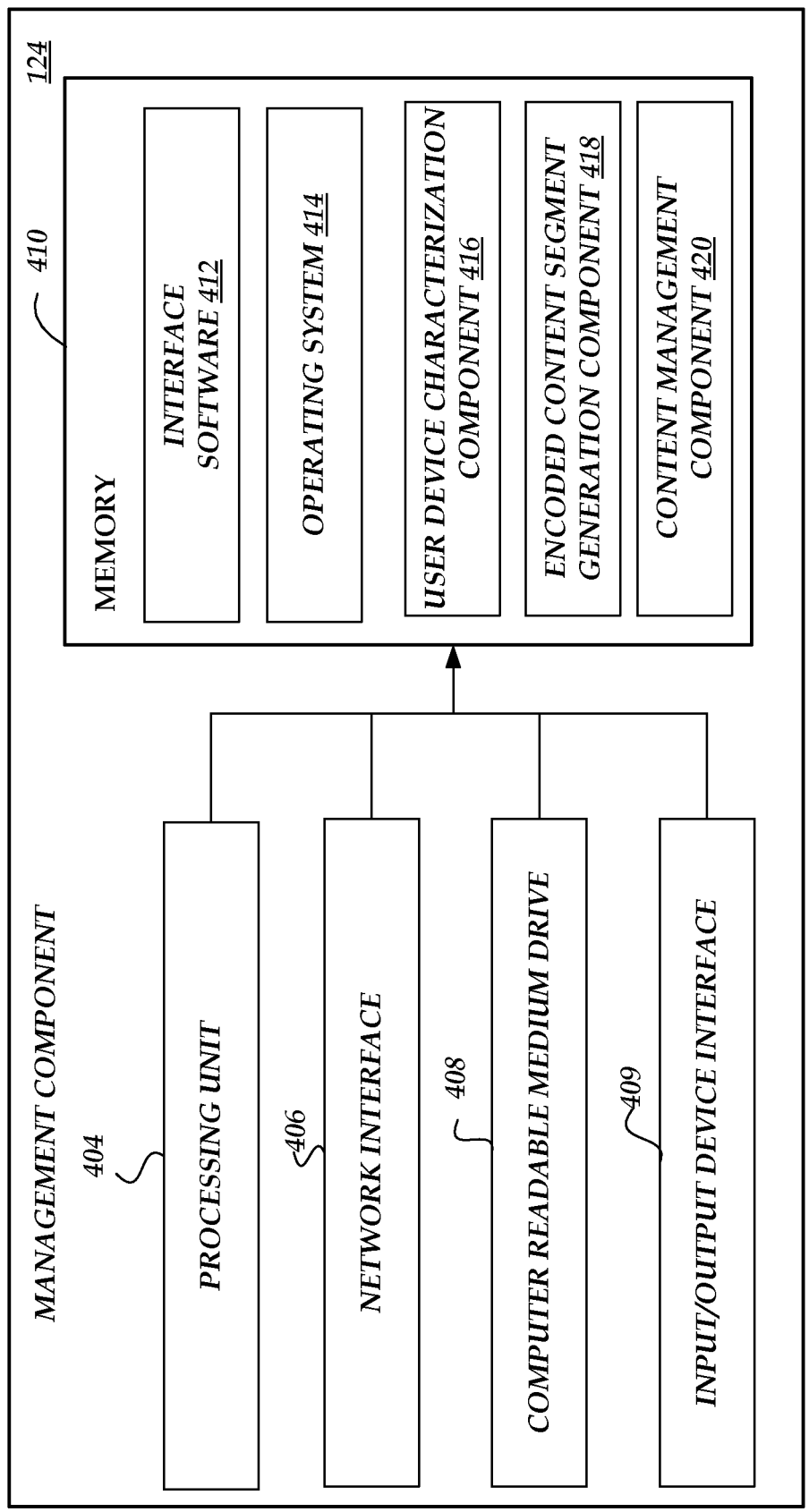
FIG. 4 is a block diagram illustrative of components of a management component of a video packing and origination service for managing the distribution of encoded content segments in accordance with some embodiments.

FIG. 4 depicts one embodiment of an architecture of an illustrative computing device for implementing various aspects of the distribution of encoded content streams or the characterization of aspects of the user device 102 as described herein. The computing device 400 can be a part of the video packaging and origination service 120, such as a management component 124. Alternatively, the computing device may a stand-alone device independent of the video packaging and origination service 120 or as part of a service/service provider also independent of the video packaging and origination service 120.

The general architecture of the computing device 400 depicted in FIG. 4 includes an arrangement of computer hardware and software components that may be used to implement aspects of the present disclosure. As illustrated, the computing device 400 includes a processing unit 404, a network interface 406, a computer readable medium drive 408, an input/output device interface 409, all of which may communicate with one another by way of a communication bus. The components of the computing device 400 may be physical hardware components or implemented in a virtualized environment.

The network interface 406 may provide connectivity to one or more networks or computing systems, such as the network 150 or network 160 of FIG. 1. The processing unit 404 may thus receive information and instructions from other computing systems or services via a network. The processing unit 404 may also communicate to and from memory 410 and further provide output information for an optional display via the input/output device interface 409. In some embodiments, the computing device 400 may include more (or fewer) components than those shown in FIG. 4.

The memory 410 may include computer program instructions that the processing unit 404 executes in order to implement one or more embodiments. The memory 410 generally includes RAM, ROM, or other persistent or non-transitory memory. The memory 410 may store an operating system 414 that provides computer program instructions for use by the processing unit 404 in the general administration and operation of the computing device 400. The memory 410 may further include computer program instructions and other information for implementing aspects of the present disclosure. For example, in one embodiment, the memory 410 includes interface software 412 for receiving and processing content streams. Memory 410 includes a client viewership statistic processing component 416 for determining or characterizing aspects related to the processing of content streams from user devices 102. The memory 410 can further include an encoded content generation routine for generating encoded content streams in a manner the mitigates, at least in part, the operation of content blocking applications in user devices 102. Still further, the memory 410 can include a content management component 420 for managing the generation of encoded content streams based on aspects of the performance of the user device 102, such as the presence or performance of media block applications on the user device.

As specified above, in one embodiment, the computing device 400 illustrated in FIG. 4 can be implemented as physical computing devices or virtualized computing devices in a computing network. In another embodiment, the computing device 400 may be implemented as logical components in a virtual computing network in which the functionality of the computing device 400 is implemented by an underlying substrate network of physical computing devices. In this embodiment, the computing device 400 may not be actually instantiated in the physical computing devices of the substrate network. Accordingly, reference to instantiation of a computing device 400 to carry out a desired function can correspond to a configuration of physical computing devices functioning as the computing device 400, instantiation of virtualized computing devices functioning as the computing device or instantiation of logical components in a virtualized network. In each of these examples, the creation, configuration and implementation of the components and the interactions described herein would vary according to the specific instantiation of the computing device 400. Thus, aspects of the present application should not be limited to interpretation requiring a physical, virtual or logical embodiment unless specifically indicated as such.

Figure 5:
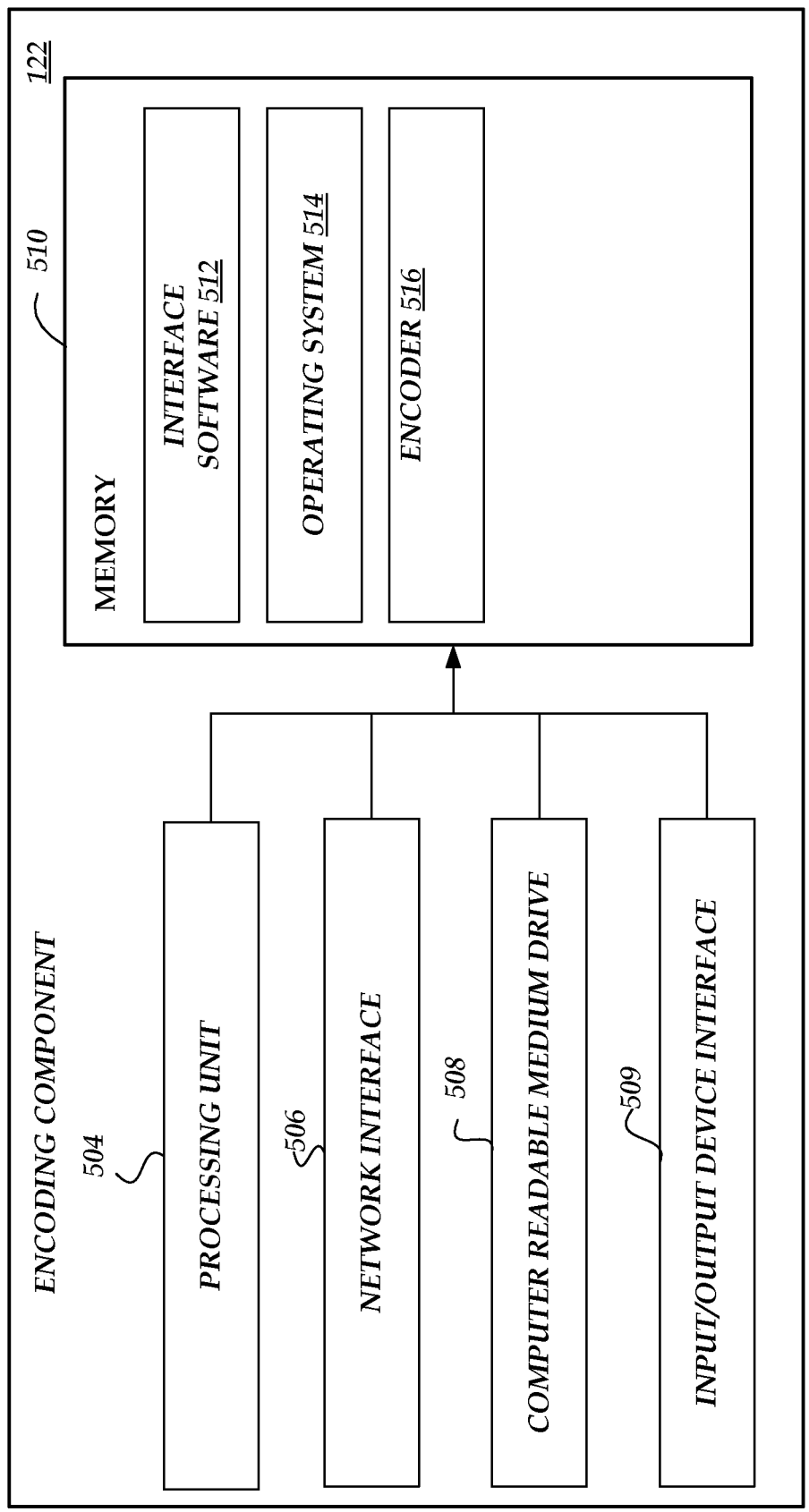
FIG. 5 is a block diagram of illustrative of components of an encoder of a packaging and origination service configured to manage content encoding in accordance with some embodiments.

FIG. 5 depicts one embodiment of an architecture of an illustrative encoding component 122 for implementing the video packaging and origination service 120 described herein. The general architecture of the encoding component 122 depicted in FIG. 5 includes an arrangement of computer hardware and software components that may be used to implement aspects of the present disclosure. As illustrated, the encoding component 122 of the video packaging and origination service 120 includes a processing unit 504, a network interface 506, a computer readable medium drive 508, an input/output device interface 509, all of which may communicate with one another by way of a communication bus. The components of the encoding component 122 may be physical hardware components or implemented in a virtualized environment.

The network interface 506 may provide connectivity to one or more networks or computing systems, such as the network 150 or network 160 of FIG. 1. The processing unit 504 may thus receive information and instructions from other computing systems or services via a network. The processing unit 504 may also communicate to and from memory 510 and further provide output information for an optional display via the input/output device interface 509. In some embodiments, the encoding component 122 may include more (or fewer) components than those shown in FIG. 5.

The memory 510 may include computer program instructions that the processing unit 504 executes in order to implement one or more embodiments. The memory 510 generally includes RAM, ROM, or other persistent or non-transitory memory. The memory 510 may store an operating system 514 that provides computer program instructions for use by the processing unit 504 in the general administration and operation of the video packaging and origination service 120. The memory 510 may further include computer program instructions and other information for implementing aspects of the present disclosure. For example, in one embodiment, the memory 510 includes interface software 512 for receiving and processing content requests from user devices 102. Memory 510 includes an encoder 516 for encoding video segments to be sent to user devices 102 in response to content requests.

As specified above, in one embodiment, the encoder components 122 illustrated in FIG. 5 can be implemented as physical computing devices or virtualized computing devices in a computing network. In another embodiment, the encoded components 122 may be implemented as logical components in a virtual computing network in which the functionality of the encoder components are implemented by an underlying substrate network of physical computing devices. In this embodiment, the logical encoder components may not be actually instantiated in the physical computing devices of the substrate network. Accordingly, reference to instantiation of the encoder components can correspond to a configuration of physical computing devices functioning as encoder components, instantiation of virtualized computing devices functioning as encoder components or instantiation of logical components in a virtualized network. In each of these examples, the creation, configuration and implementation of the components and the interactions described herein would vary according to the specific instantiation of the encoder component. Thus, aspects of the present application should not be limited to interpretation requiring a physical, virtual or logical embodiment unless specifically indicated as such.

Figure 6A:
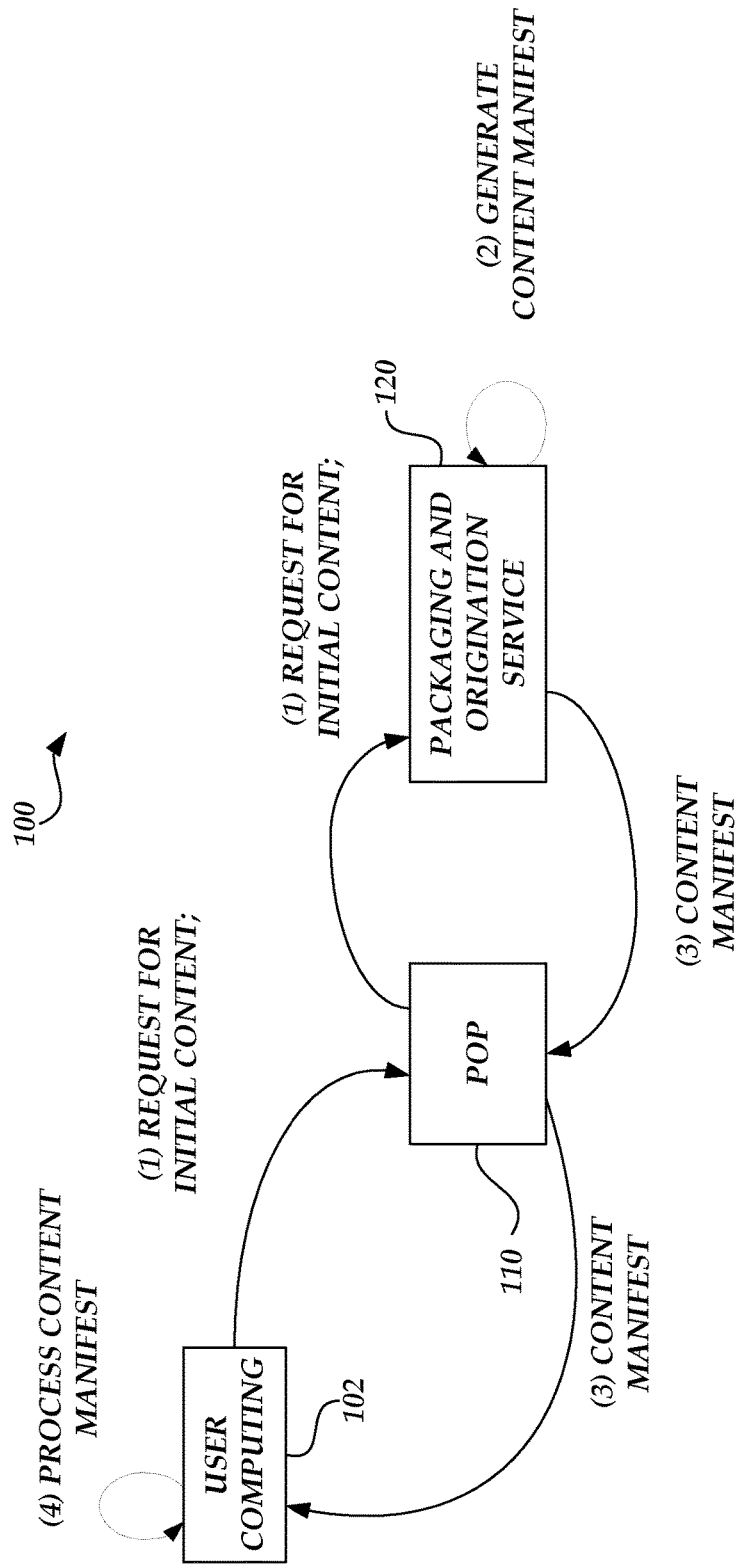
FIGS. 6A-6B are block diagrams of the content delivery environment of FIG. 1 illustrating the characterization of aspect of the user device based on receipt and processing of requests for encoded content segments.
Figure 6B:
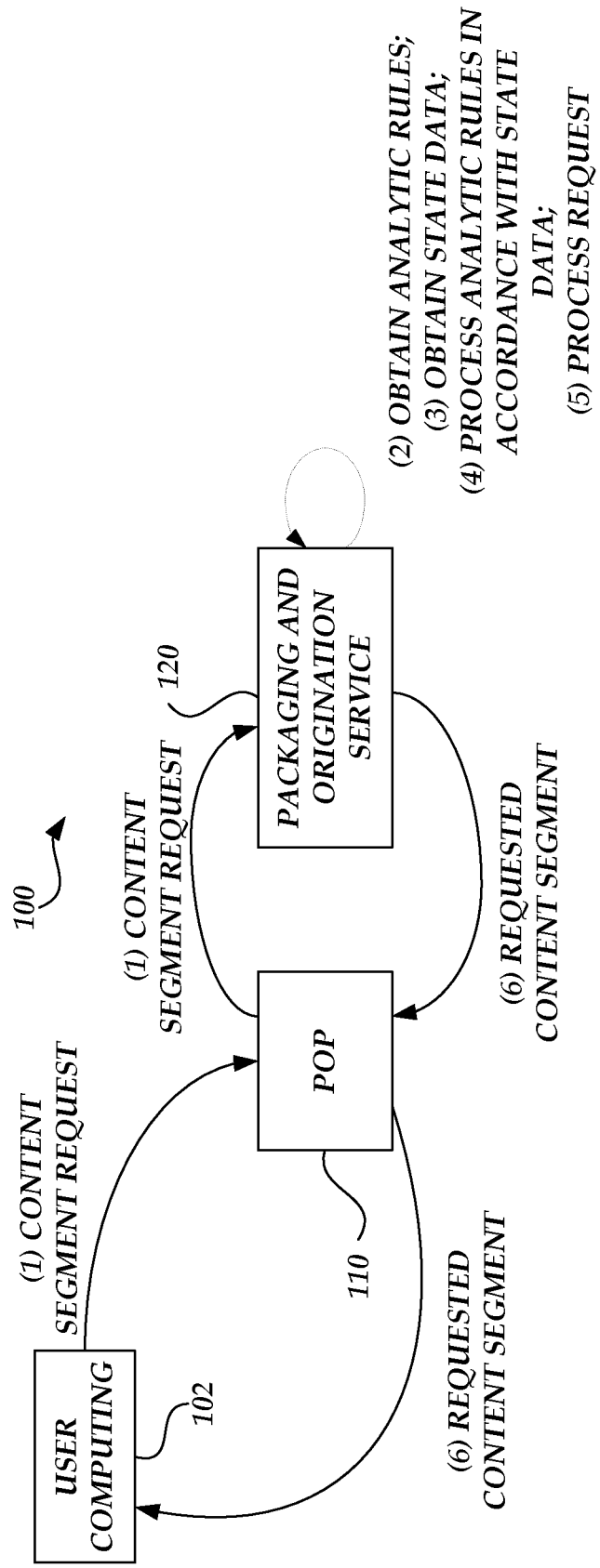

Turning now to FIGS. 6A and 6B, an illustrative interaction for the processing of content requests will be described. For purposes of illustration, content requests by the user device 102 will be described with regard to the transmission of segmented encoded contents, such as in accordance with DASH. Such interaction is illustrative and other forms of content transmission may be utilized. At (1), the user device 102 transmits a request for content. Illustratively, a user can access one or more software applications on the user device 102 to request content, such as streaming content. For example, the user device 102 can generate an interface for receiving user commands or interactions and transmit the request, such as via the media application 318. The initial content request may be transmitted directly to the video packaging and origination service 120. Alternatively, the initial content request may be routed, such as via DNS routing or HTTP-based routing, to a POP 110.

In response, at (2), the video packaging and origination service 120 generates or otherwise obtains a content manifest that identifies a listing of available encoding bitrates or bitrate/format combinations for one or more encoded content segments segment of the requested content. Illustratively, the listing of available encoding bitrates or bitrate/format combinations includes sufficient information that allows the user computing device 102 to process the information and request individual encoded content segments from the content stream. The encoded content segments can be identified sequentially in a manner that determines, at least in part, an order of request and rendering on the user device 102. For example, content segments can be associated with a programming time stamp ("PTS") value that establishes an order for the segment relative to other segments. Additionally, in some embodiments, the encoded content in the content manifest can be associated with multiple portions. For example, the encoded content may be associated with a first portion corresponding to the requested content (e.g., a movie or live event) and a second portion corresponding to additional or supplemental content. Illustratively, the additional or supplemental content can be advertisements or additional content that is to be rendered along with the requested content. In embodiments in which the content streams include multiple portions, as identified above, the encoded content segments associated with the different portions may be sequenced differently or have distinguishable names or PTS values. Alternatively, in some embodiments, the requested content segments may share common sequential information, such as PTS values that are not distinguishable to identify the different portions. The content manifests can further include additional meta-data, such as hyperlinks, display configurations, or other information utilized by the user device 102. At (3), the video packaging and origination service 120 transmits the content manifest to the user device 102.

Turning now to FIG. 6B, at (1), the user device 102, through the media application, transmits requests for content. Illustratively, for segmented content, the request can identify one or more segments of video at a selected encoding bitrate, or bitrate/format combination. The video packaging and origination service 120 receives the request and transmits the requested segment to the user computing device. For purposes of the present application, the process of selecting and requesting segments according to an encoding bitrate or bitrate/format combinations by the user computing device 102 and transmitting the requested bitrate can be repeated a number of times. Such a repetitive process would be indicative of a sequential transmission of segments for streaming content. Additionally, as described above, the requests for content correspond to the specific content encoding protocol and may not include any additional information utilized by the video packaging and origination service 120. In other embodiments, the request may optionally include some form of reporting information supplemental to the request, but can be ignored or processed separately by the video packaging and origination service 120.

Based on the requests for encoded content segments, the video packaging and origination service 120 generates or calculates user processing information characterizing one or more attributes related to the receipt of encoded content streams by receiving user devices. More specifically, at (2), the video packaging and origination service 120 obtains analytic processing rules corresponding to information included in or otherwise associated with the encoded content segment request. By way of illustrative example, the analytics rules can establish a time window in which sequential content segment requests can be received from a user device 102. Evaluation of this rule, along with state data may allow the video packaging and origination service 120 to determine whether a user device 102 has paused the playback of content streams. In another example, the analytic rules can establish the sequential order of content segment requests, such as by sequence number. Evaluation of this rule, along with state data may allow the video packaging and origination service 120 to determine whether a user device 120 is attempting to skip one or more portions of encoded content streams have been skipped, blocked or otherwise bypassed. In still another example, the analytic rules can establish whether inputs from external devices, such as home assistants or mobile devices, can be indicative of whether volume levels on the user device 102 have been muted or set below threshold levels.

At (3), the video packaging and origination service 120 obtains state data related to one or more historical requests or other measure user device activity. Such state data can include a time of a last requested content segment, a number of total requested content segments, a last requested segment identifier, previously measured volume levels, and the like. The requested state data may be obtained individually, in groups, or collectively as a whole. In conjunction with state data maintained by the video packaging and origination service, the video packaging and origination service can associate viewership or user activity based on interaction with the user device at (4) by evaluation of the analytic rules utilizing the received content segment request(s) and the state data. For example, as the video packaging and origination service identifies available streaming content segments in a manifest that is organized in accordance with a sequence of content streams. As content stream segments from the manifest are received from user devices, the video packaging and origination service can estimate a consumption rate for the streaming content and identify whether the user device is likely attempting to skip one or more content stream segments.

In another example, if the embedded content streams include links or resource identifiers associated with third parties that facilitate additional action, such as accessing a Web site, the content streams can be configured with links or resource identifiers that cause a selection of the link to be received by the video packaging and origination service to record the selection and then be directed to an intended third party source. In still another example, the video packaging and origination service can access additional device or receive additional inputs from computing devices associated with a requesting user. For example, a mobile device or home device may be configured to record volume levels at defined times. Utilizing such information, the video packaging and origination service can attribute volume levels, user interaction or other characteristics with the rendering of content streams. At (5), the video packaging and origination service 120 processes the request for content segments and transmits it to the user device at (6).

Illustratively, the video packaging and origination service 120 can utilize the processing results, such as a determination of whether content segments have been skipped or the consumption right in a variety of ways. For example, the calculated information may be utilized to set content rates or confirm whether service level agreement terms have been satisfied. The results may be also generated in notifications or included in part of a user interface, such as dashboard. In another example, the video packaging and origination service 120 can transmit the results (at least partially) to one or more designated recipients. In another example, the video packaging and origination service 120 can generate administrative user interfaces that can summarize statistics about individual user devices or groups of user devices (such as by region or other organizational criteria). Still further, the results may be added or combined with historical information to generate statistics, such as consumption rate for individual user devices or multiple devices. Still further, the results may be utilized by the video packaging and origination service 120 to modify how content streams are provided to the user device 102, such as attempting to obfuscate the content blocking functionality of an application on the user device.

Figure 7:
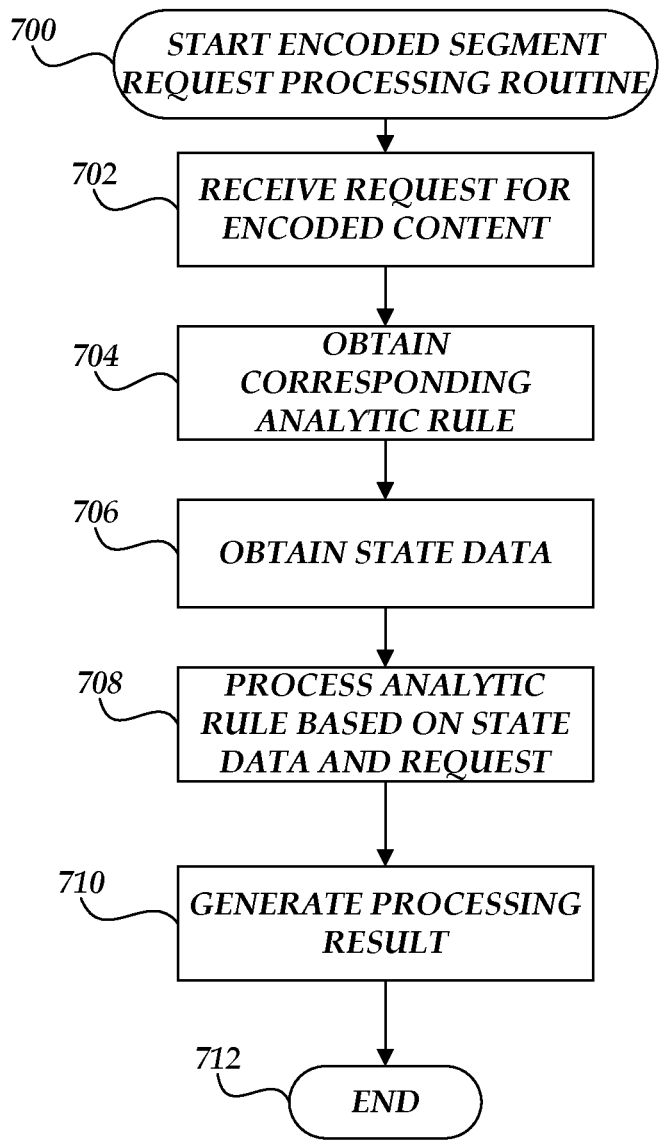
FIG. 7 is a flow diagram illustrative of an encoded content distribution routine implemented by a video packaging and origination system in accordance with some embodiments.

Turning now to FIG. 7, a flow diagram 700 illustrative of a viewership statistic processing routine 700 implemented by the video packaging and origination service 120 will be described. Illustratively, routine 700 can be implemented upon receipt of one or more request for content segments from the user device. Illustratively, as described above, the user device 102 transmits a request for content. Illustratively, a user can access one or more software applications on the user device 102 to request content, such as streaming content. For example, the user device 102 can generate an interface for receiving user commands or interactions and transmit the request, such as via the media application 318. The initial content request may be transmitted directly to the video packaging and origination service 120. Alternatively, the initial content request may be routed, such as via DNS routing or HTTP-based routing, to a POP 110.

In response, the video packaging and origination service 120 generates a content manifest that identifies a listing of available encoding bitrates or bitrate/format combinations for a first segment of the requested content. Illustratively, the listing of available encoding bitrates or bitrate/format combinations includes sufficient information that allows the user computing device 102 to process the information and request individual encoded content segments from the content stream. The encoded content segments can be identified sequentially in a manner that determines, at least in part, an order of request and rendering on the user device 102. Additionally, in some embodiments, the manifest can identify multiple portions, such as a first portion corresponding to the requested content (e.g., a movie or live event) and a second portion corresponding to additional or supplemental content. Illustratively, the additional or supplemental content can be advertisements or additional content that is to be rendered along with the requested content. In embodiments in which the content streams include multiple portions, as identified above, each portion may be sequenced differently. Alternatively, in some embodiments, the requested content segments may share common sequencing data. The content manifests can further include additional meta-data, such as hyperlinks, display configurations, or other information utilized by the user device 102. The video packaging and origination service 120 transmits the content manifest to the user device 102.

At block 702, the video packaging and origination service 120 receives the request for a content segment or multiple content segments. Illustratively, the user device 102, through the media application, transmits requests for one or more segments of video at a selected encoding bitrate, or bitrate/format combination. The video packaging and origination service 120 receives the request and transmits the requested segment to the user computing device. For purposes of the present application, the process of selecting and requesting segments according to an encoding bitrate or bitrate/format combinations by the user computing device 102 and transmitting the requested bitrate can be repeated a number of times. Such a repetitive process would be indicative of a sequential transmission of segments for streaming content.

Based on the requests for encoded content segments, the video packaging and origination service 120 generates or calculates user processing information characterizing one or more attributes related to the receipt of encoded content streams by receiving user devices. More specifically, at block 704, the video packaging and origination service 120 obtains analytic processing rules corresponding to information included in or otherwise associated with the encoded content segment request. By way of illustrative example, the analytics rules can establish a time window in which sequential content segment requests can be received from a user device 102. Evaluation of this rule, along with state data may allow the video packaging and origination service 120 to determine whether a user device 102 has paused the playback of content streams. In another example, the analytic rules can establish the sequential order of content segment requests, such as by sequence number. Evaluation of this rule, along with state data may allow the video packaging and origination service 120 to determine whether a user device 120 is attempting to skip one or more portions of encoded content streams have been skipped, blocked or otherwise bypassed. In still another example, the analytic rules can establish whether inputs from external devices, such as home assistants or mobile devices, can be indicative of whether volume levels on the user device 102 have been muted or set below threshold levels.

At block 706, the video packaging and origination service 120 obtains state data related to one or more historical requests or other measure user device activity. Such state data can include a time of a last requested content segment, a number of total requested content segments, a last requested segment identifier, previously measured volume levels, and the like. At block 708, in conjunction with state data maintained by the video packaging and origination service, the video packaging and origination service can associate viewership or user activity based on interaction with the user device by evaluation of the analytic rules utilizing the received content segment request(s) and the state data. For example, as the video packaging and origination service identifies available streaming content segments in a manifest that is organized in accordance with a sequence of content streams. As content stream segments from the manifest are received from user devices, the video packaging and origination service can estimate a consumption rate for the streaming content and identify whether the user device is likely attempting to skip one or more content stream segments. In another example, if the embedded content streams include links or resource identifiers associated with third parties that facilitate additional action, such as accessing a Web site, the content streams can be configured with links or resource identifiers that cause a selection of the link to be received by the video packaging and origination service to record the selection and then be directed to an intended third party source. In still another example, the video packaging and origination service can access additional device or receive additional inputs from computing devices associated with a requesting user. For example, a mobile device or home device may be configured to record volume levels at defined times. Utilizing such information, the video packaging and origination service can attribute volume levels, user interaction or other characteristics with the rendering of content streams. Illustratively, the video packaging and origination service 120 also processes the request for content segments and transmits the requested content to the user device 102. More specifically, the characterization of the attribute of the user device 102 is based on receiving and processing content requests without requiring additional or supplemental reporting from the user device. Accordingly, the video packaging and origination service attempts to provide a responsive communication (e.g., the requested content) because this is the primary purpose of the user device request.

At block 710, the video packaging and origination service 120 can generate a processing result. Illustratively, the video packaging and origination service 120 can utilize the processing results, such as a determination of whether content segments have been skipped or the consumption right in a variety of ways. For example, the calculated information may be utilized to set content rates or confirm whether service level agreement terms have been satisfied. The results may be also generated in notifications or included in part of a user interface, such as dashboard. In another example, the video packaging and origination service 120 can transmit the results (at least partially) to one or more designated recipients. In another example, the video packaging and origination service 120 can generate administrative user interfaces that can summarize statistics about individual user devices or groups of user devices (such as by region or other organizational criteria). Still further, the results may be added or combined with historical information to generate statistics, such as consumption rate for individual user devices or multiple devices. Still further, the results may be utilized by the video packaging and origination service 120 to modify how content streams are provided to the user device 102, such as attempting to obfuscate the content blocking functionality of an application on the user device. At block 712, the routine 700 terminates.

Figure 8:
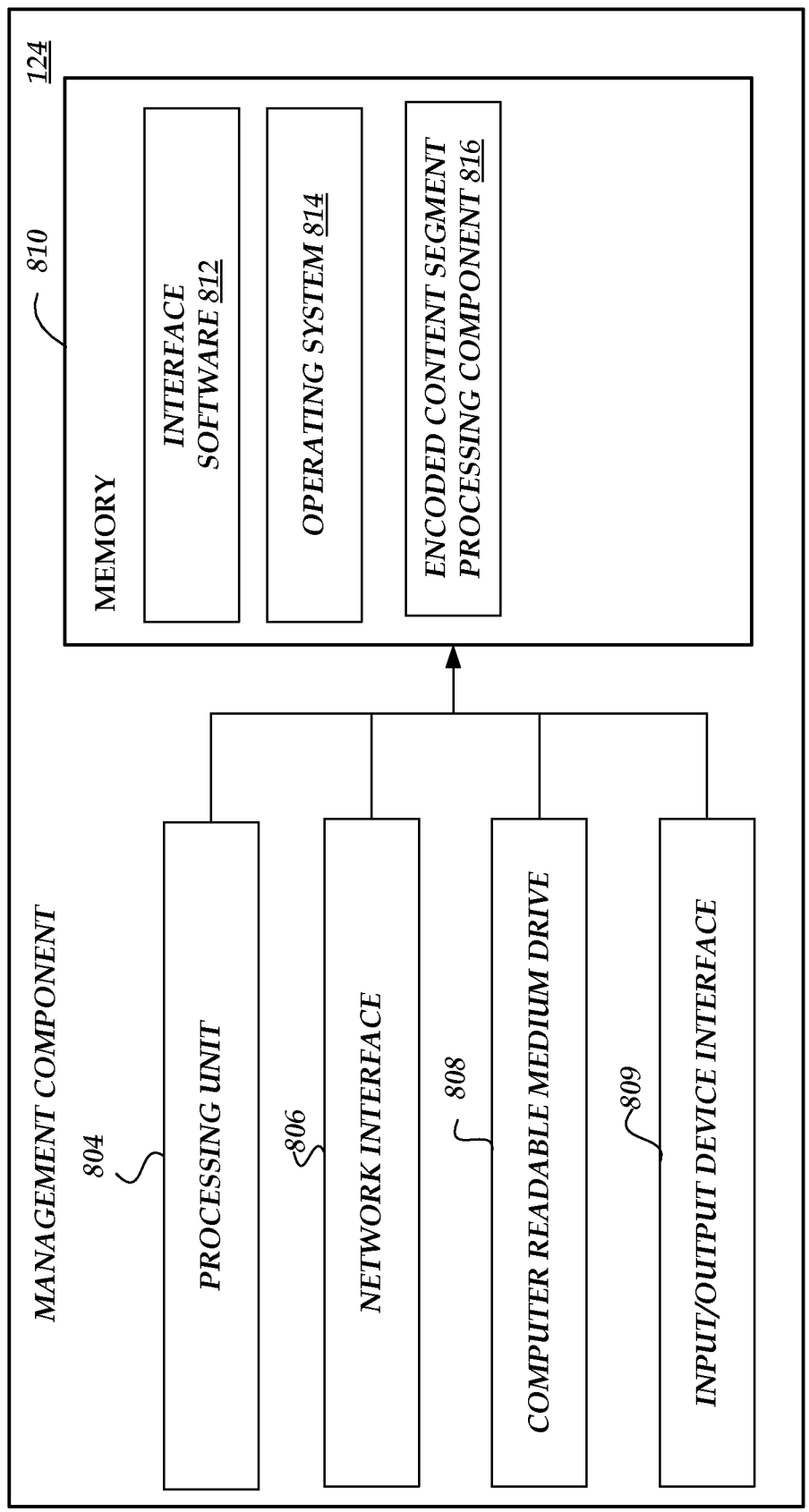
FIG. 8 is a block diagram illustrative of components of a management component of a video packing and origination service for managing the distribution of encoded content segments in accordance with some embodiments.

FIG. 8 depicts one embodiment of an architecture of an illustrative computing device for implementing various aspects of the distribution of encoded content streams or the characterization of aspects of the user device 102 as described herein. The computing device 800 can be a part of the video packaging and origination service 120, such as a management component 124. Alternatively, the computing device may a stand-alone device independent of the video packaging and origination service 120 or as part of a service/service provider also independent of the video packaging and origination service 120.

The general architecture of the computing device 800 depicted in FIG. 8 includes an arrangement of computer hardware and software components that may be used to implement aspects of the present disclosure. As illustrated, the computing device 800 includes a processing unit 804, a network interface 806, a computer readable medium drive 808, an input/output device interface 809, all of which may communicate with one another by way of a communication bus. The components of the computing device 800 may be physical hardware components or implemented in a virtualized environment.

The network interface 806 may provide connectivity to one or more networks or computing systems, such as the network 150 or network 160 of FIG. 1. The processing unit 804 may thus receive information and instructions from other computing systems or services via a network. The processing unit 804 may also communicate to and from memory 810 and further provide output information for an optional display via the input/output device interface 409. In some embodiments, the computing device 800 may include more (or fewer) components than those shown in FIG. 8.

The memory 810 may include computer program instructions that the processing unit 804 executes in order to implement one or more embodiments. The memory 810 generally includes RAM, ROM, or other persistent or non-transitory memory. The memory 810 may store an operating system 814 that provides computer program instructions for use by the processing unit 804 in the general administration and operation of the computing device 800. The memory 810 may further include computer program instructions and other information for implementing aspects of the present disclosure. For example, in one embodiment, the memory 810 includes interface software 812 for receiving and processing content streams. Memory 810 includes an encoded content segment processing component 816 for determining or characterizing the processing of content streams from user devices 102 to execute techniques for mitigating the performance of blocking applications.

As specified above, in one embodiment, the computing device 800 illustrated in FIG. 8 can be implemented as physical computing devices or virtualized computing devices in a computing network. In another embodiment, the computing device 800 may be implemented as logical components in a virtual computing network in which the functionality of the computing device 800 is implemented by an underlying substrate network of physical computing devices. In this embodiment, the computing device 800 may not be actually instantiated in the physical computing devices of the substrate network. Accordingly, reference to instantiation of a computing device 800 to carry out a desired function can correspond to a configuration of physical computing devices functioning as the computing device 800, instantiation of virtualized computing devices functioning as the computing device or instantiation of logical components in a virtualized network. In each of these examples, the creation, configuration and implementation of the components and the interactions described herein would vary according to the specific instantiation of the computing device 800. Thus, aspects of the present application should not be limited to interpretation requiring a physical, virtual or logical embodiment unless specifically indicated as such.

Figure 9A:
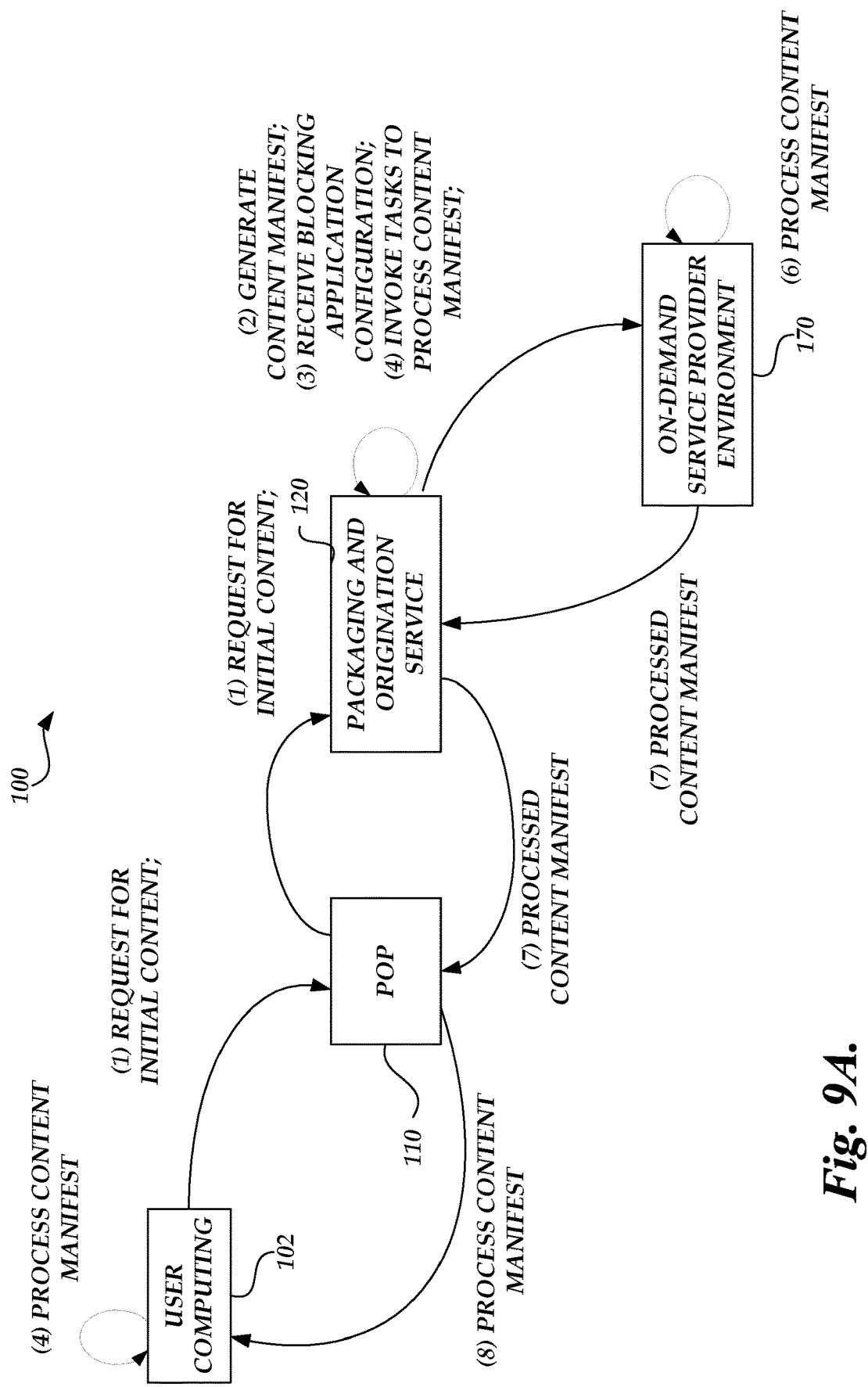
FIGS. 9A-9B are block diagrams of the content delivery environment of FIG. 1 illustrating the generation and processing on content manifests for encoded content segments.
Figure 9B:
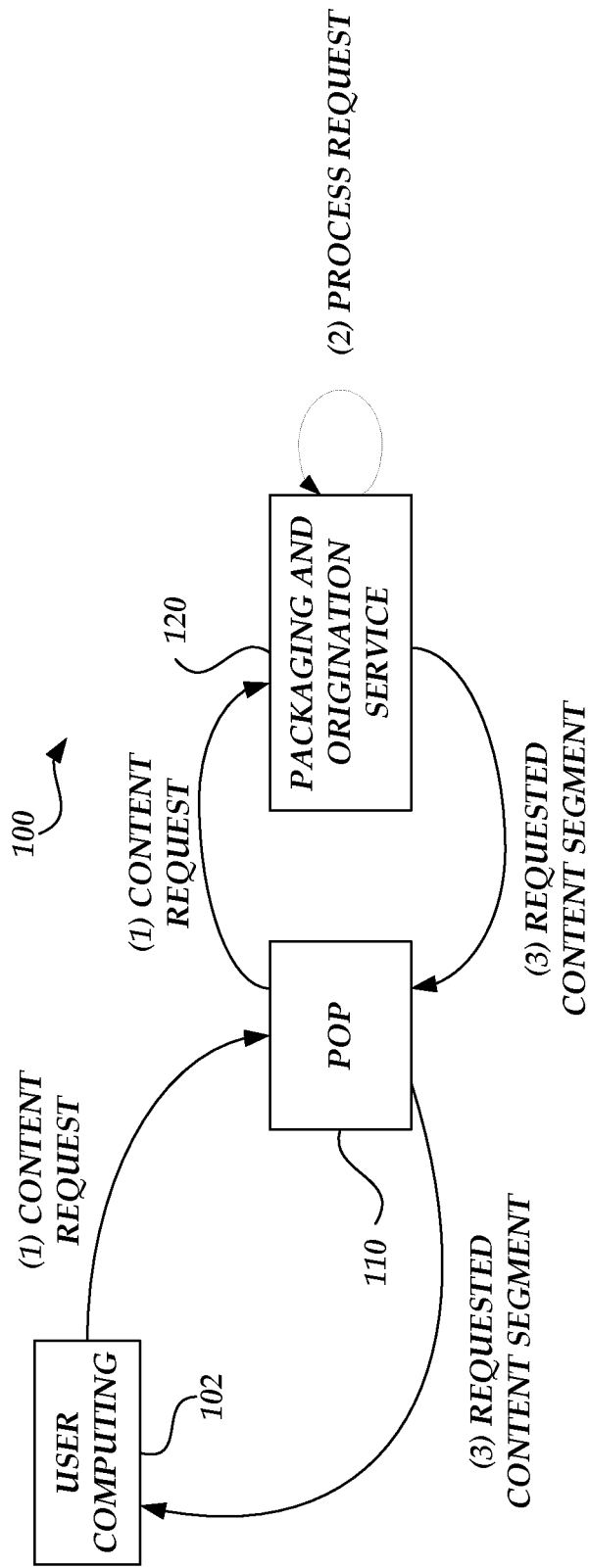

Turning now to FIGS. 9A and 9B, an illustrative interaction for the processing of content requests will be described. For purposes of illustration, content requests by the user device 102 will be described with regard to the transmission of segmented encoded contents, such as in accordance with DASH. Such interaction is illustrative and other forms of content transmission may be utilized. At (1), the user device 102 transmits a request for content. Illustratively, a user can access one or more software applications on the user device 102 to request content, such as streaming content. For example, the user device 102 can generate an interface for receiving user commands or interactions and transmit the request, such as via the media application 318. The initial content request may be transmitted directly to the video packaging and origination service 120. Alternatively, the initial content request may be routed, such as via DNS routing or HTTP-based routing, to a POP 110.

In response, at (2), the video packaging and origination service 120 generates or otherwise obtains a content manifest that identifies a listing of available encoding bitrates or bitrate/format combinations for a first segment of the requested content. Illustratively, the listing of available encoding bitrates or bitrate/format combinations includes sufficient information that allows the user computing device 102 to process the information and request individual encoded content segments from the content stream. The encoded content segments can be identified sequentially in a manner that determines, at least in part, an order of request and rendering on the user device 102. Additionally, in some embodiments, the manifest can identify multiple portions, such as a first portion corresponding to the requested content (e.g., a movie or live event) and a second portion corresponding to additional or supplemental content. Illustratively, the additional or supplemental content can be advertisements or additional content that is to be rendered along with the requested content. In embodiments in which the content streams include multiple portions, as identified above, each portion may be sequenced differently. Alternatively, in some embodiments, the requested content segments may share common sequencing data. The content manifests can further include additional meta-data, such as hyperlinks, display configurations, or other information utilized by the user device 102.

At (3), the video packaging and origination service 120 receives or generates configuration information for the mitigating at least a portion of the functionality of a blocking application. Illustratively, the configuration information can include the selection of one or more mitigation techniques and the frequency in which the mitigation technique is implemented. The configuration information can be fixed in advance, independent of user devices 102 or a determination of whether blocking applications (or anti-ad applications) are present and being executed. In other embodiments, the mitigation technique and frequency in which the mitigation technique is implemented can be dynamically modified based on individual user devices 102, groups of user devices, regions/network criteria, and other similar criteria. Still further, the mitigation technique and frequency in which the mitigation technique is implemented can be dynamically adjusted based on a determination or characterization that a blocking application is being executed. Even further, the mitigation technique and frequency in which the mitigation technique is implemented can be dynamically adjusted based on a characterization of the effectiveness or continued presence of a blocking application after a previous attempt to implement a mitigation technique. For example, the video packaging and origination service 120 can implement modifications to naming conventions if adjustment of PTS information does not appear to have caused a change in the detected presence of a blocking application on the user device 102.

In one embodiment, the video packaging and origination service can modify personal time stamps or other sequential information that are utilized to identify the sequence of encoded content segments to the user device. As described above, the personal time stamps or sequential information define logical order of received encoded content segments. In embodiments in which supplemental content, such as advertisement content, utilizes different PTS information, blocking applications can utilize the change in sequence information to identify the supplemental content to be blocked. Accordingly, in one aspect, the video packaging and origination service can invoke a task to modify the sequencing information to attempt to remove the differences in sequential information, such as changing the PTS information utilized in the supplemental content to match the PTS information of the other portions of content or replacing the PTS information for both the supplemental content and other portions to a common PTS format. In another aspect, the video packaging and origination service can invoke a task to insert additional or alternative discontinuities or other changes in the sequential information in the content manifest. The inserted discontinuities would create changes in the other portion of the content streams corresponding to the requested content. Illustratively, the additional or alternative discontinuities cab cause a blocking application to attempt to identify incorrectly supplemental or advertisement content. By modifying traditional sequential information, such as inserting discontinuity in the sequence of segments, the video packaging and origination service 120 can make identification of advertisement content or supplemental content more difficult for the user computing device.

In another embodiment, the video packaging and origination service 120 can modify naming information for the segments to mitigate allowing blocking applications to utilize naming information or keywords to identify advertisement or supplement content. More specifically, the video packaging and origination service 120 can invoke a task to cause a change or replacement of naming conventions for advertisement content segments, such as URLs or names of advertisement providers. Still further, in another embodiment, the video packaging and origination service 120 can invoke a task to utilize encryption such the user computing devices 102 cannot readily identify naming information for individual segments, except in an encrypted form. In this regard, the user device 102 can identify individual segments from the content manifests but would not have access to the name of the segments, which cannot be decrypted. The various techniques for modifying or obfuscating naming information prevents or mitigates the ability for anti-ads application to identify advertisement content by name.

Based on the configuration, at (4), the video packaging and origination service 120 can invoke one or more tasks from the on-demand service provider 170. At (5), the on-demand service provider 170 would execute one or more instances of on-demand code to cause the implementation of one or more or multiple mitigation techniques as specified in the configuration. In embodiments, in which the configuration information for the mitigating at least a portion of the functionality of a block application is already generated, the execution of the on-demand code may include recalling or receiving the configuration information and the video packaging and origination service 120 may not require the access or processing as described at (3). At (6), the on-demand service provider 170 executes the task and returns the processed content manifest at (7). At (8), the video packaging and origination service 120 then transmits the processed content manifest to the user device 102.

Turning now to FIG. 9B, at (1), the user device 102, through the media application, transmits requests for one or more segments of video at a selected encoding bitrate, or bitrate/format combination. The video packaging and origination service 120 receives the request and transmits the requested segment to the user computing device. For purposes of the present application, the process of selecting and requesting segments according to an encoding bitrate or bitrate/format combinations by the user computing device 102 and transmitting the requested bitrate can be repeated a number of times. Such a repetitive process would be indicative of a sequential transmission of segments for streaming content.

At (2), the video packaging and origination service 120 processes the content request. Illustratively, the processing of the request can correspond to identification of the requested content. In other embodiments, the video packaging and origination service 120 can also conduct additional processing, such as decryption, to facilitate identification of the requested content segment by the video packaging and origination service 120. At (3), the video packaging and origination service 120 transmits requested content to the user device 120.

Figure 10:
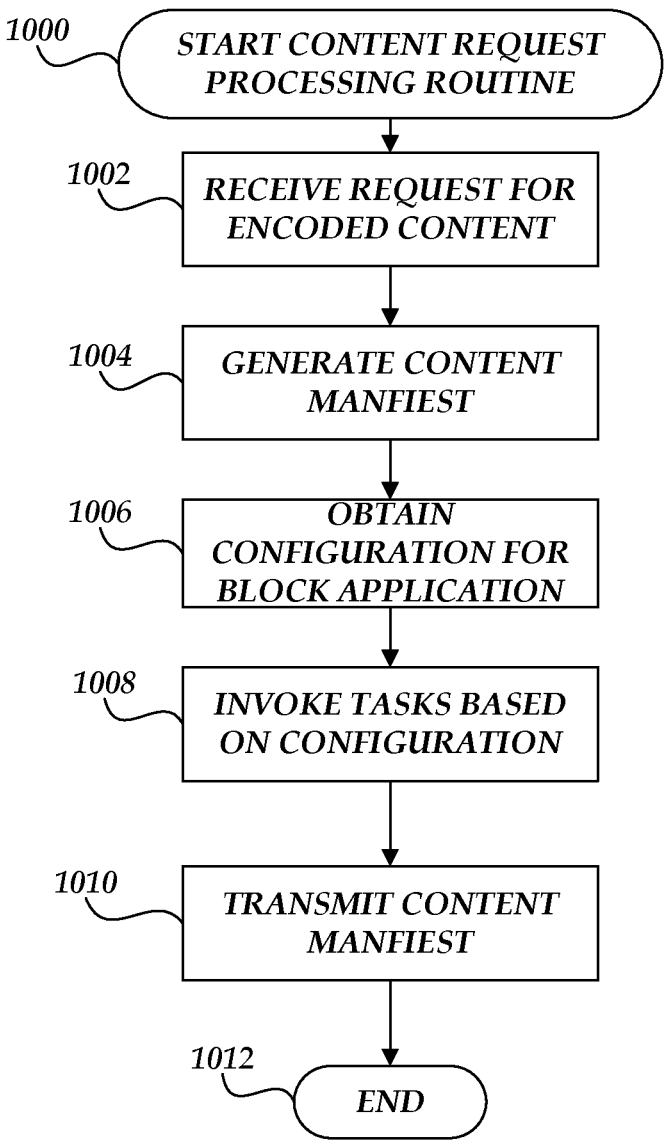
FIG. 10 is a flow diagram illustrative of an encoded content processing routine implemented by a video packaging and origination system in accordance with some embodiments.

Turning now to FIG. 10, a flow diagram 1000 illustrative of a encoded content processing routine 1000 implemented by the video packaging and origination service 120 will be described. Illustratively, routine 1000 can be implemented upon receipt of one or more request for content segments from the user device. Illustratively, at block 1002, the user device 102 transmits a request for content. Illustratively, a user can access one or more software applications on the user device 102 to request content, such as streaming content. For example, the user device 102 can generate an interface for receiving user commands or interactions and transmit the request, such as via the media application 318. The initial content request may be transmitted directly to the video packaging and origination service 120. Alternatively, the initial content request may be routed, such as via DNS routing or HTTP-based routing, to a POP 110.

In response, at block 1004, the video packaging and origination service 120 generates a content manifest that identifies a listing of available encoding bitrates or bitrate/format combinations for a first segment of the requested content. Illustratively, the listing of available encoding bitrates or bitrate/format combinations includes sufficient information that allows the user computing device 102 to process the information and request individual encoded content segments from the content stream. The encoded content segments can be identified sequentially in a manner that determines, at least in part, an order of request and rendering on the user device 102. Additionally, in some embodiments, the manifest can identify multiple portions, such as a first portion corresponding to the requested content (e.g., a movie or live event) and a second portion corresponding to additional or supplemental content. Illustratively, the additional or supplemental content can be advertisements or additional content that is to be rendered along with the requested content. In embodiments in which the content streams include multiple portions, as identified above, each portion may be sequenced differently. Alternatively, in some embodiments, the requested content segments may share common sequencing data. The content manifests can further include additional meta-data, such as hyperlinks, display configurations, or other information utilized by the user device 102. The video packaging and origination service 120 transmits the content manifest to the user device 102.

At block 1006, the video packaging and origination service 120 receives or generates configuration information for the mitigating at least a portion of the functionality of a block application. Illustratively, the configuration information can include the selection of one or more mitigation techniques and the frequency in which the mitigation technique is implemented. The configuration information can be fixed in advance, independent of user devices 102 or a determination of whether blocking applications (or anti-ad applications) are present and being executed. In other embodiments, the mitigation technique and frequency in which the mitigation technique is implemented can be dynamically modified based on individual user devices 102, groups of user devices, regions/network criteria, and other similar criteria. Still further, the mitigation technique and frequency in which the mitigation technique is implemented can be dynamically adjusted based on a determination or characterization that a blocking application is being executed. Even further, the mitigation technique and frequency in which the mitigation technique is implemented can be dynamically adjusted based on a characterization of the effectiveness or continued presence of a blocking application after a previous attempt to implement a mitigation technique. For example, the video packaging and origination service 120 can implement modifications to naming conventions if adjustment of PTS information does not appear to have caused a change in the detected presence of a blocking application on the user device 102.

In one embodiment, the video packaging and origination service can modify personal time stamps or other sequential information that are utilized to identify the sequence of encoded content segments to the user device. As described above, the personal time stamps or sequential information define logical order of received encoded content segments. In embodiments in which supplemental content, such as advertisement content, utilizes different PTS information, blocking applications can utilize the change in sequence information to identify the supplemental content to be blocked. Accordingly, in one aspect, the video packaging and origination service can invoke a task to modify the sequencing information to attempt to remove the differences in sequential information. As discussed above, there are illustratively a number of techniques for modifying the sequencing information such as selecting one sequencing information as a master, selecting new sequencing information as the master, and the like. In another aspect, the video packaging and origination service can invoke a task to insert discontinuities or other changes in the sequential information. The inserted discontinuities would create changes in the portion of the content streams corresponding to the requested content. Accordingly, this could cause the blocking application to attempt to identify incorrectly supplemental or advertisement content. By modifying traditional sequential information, such as inserting discontinuity in the sequence of segments, the video packaging and origination service can make identification of advertisement content or supplemental content more difficult for the user computing device.

In another embodiment, the video packaging and origination service can modify naming information for the segments to mitigate utilizing naming information to identify advertisement or supplement content. More specifically, the video packaging and origination service 120 can invoke a task to cause a change or replacement of naming conventions for advertisement content segments, such as URLs or names of advertisement providers. Still further, in another embodiment, the video packaging and origination service can invoke a task to utilize encryption such the user computing devices cannot readily identify naming information for individual segments, except in an encrypted form. In this regard, the user device 102 can identify individual segments but could not have access to the name of the segments, which cannot be decrypted. The various techniques for modifying or obfuscating naming information prevents or mitigates the ability for anti-ads application to identify advertisement content by name.

Based on the configuration, at block 1008, the video packaging and origination service 120 can invoke one or more tasks from the on-demand service provider 170 to cause the implementation of one or more or multiple techniques, as described above. At block 1010, the video packaging and origination service 120 then transmits the processed content manifest to the user device 102. At block 1012, the routine 1000 terminates.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system to transmit content comprising:
one or more computing devices associated with a video packaging and origination service, wherein the video packaging and origination service is configured to:
generate an initial content manifest corresponding to a plurality of encoded segments stored in a data store, each encoded segment of the plurality of encoded segments identified in the initial content manifest is associated with timing information that is used to identify an order of received encoded segments to a user device and naming information;

receive content requests from one or more computing devices;

obtain configuration information corresponding to an identification of a processing technique for generating a first processed content manifest, the processing technique configured to mitigate identification of encoded advertisement segments by a blocking software application, the processing technique selected from at least one of modifying the timing information or the naming information associated with the encoded advertisement segments, wherein the encoded advertisement segments have different timing information than timing information assigned to requested content; and transmit the first processed content manifest responsive to the received content requests; and one or more computing devices associated with an on-demand service, wherein the on-demand service is configured to:

perform the identified processing technique using the encoded advertisement segments identified in the initial content manifest to generate the first processed content manifest, wherein the modification of the timing information comprises changing the timing information assigned to one or more of the encoded advertisement segments to match the timing information assigned to the requested content.

2. The system of claim 1, wherein the video packaging and origination service is further configured to:

receive information corresponding to at least one of a presence or performance of the blocking software application on a user device; and obtain updated configuration information responsive to the information corresponding to the at least one of the presence or performance of the blocking software application on the user device, the updated configuration information corresponding to an updated identification of the processing technique configured to mitigate the identification of the encoded advertisement segments by the blocking software application.

3. The system of claim 2, wherein the on-demand service is further configured to perform the updated processing technique using the encoded advertisement segments identified in the first content manifest to generate a second processed content manifest.

4. The system of claim 2, wherein receiving the information corresponding to at least one the presence or performance of the blocking software application includes:

receiving the content requests from the user device;

obtaining at least one analytic rule for evaluation of the content requests;

obtaining state data indicative of a historical receipt of content requests; and determining a processing result based on evaluation of the at least one analytic rule, state data and content requests.

5. A computer-implemented method to manage delivery of encoded content segments comprising:

receiving with a content delivery service content requests from one or more computing devices;

obtaining with the content delivery service at least one analytic rule for evaluation of the received content requests, the at least one analytic rule corresponding to information associated with the received content requests;

obtaining with the content delivery service state data indicative of a historical receipt of content requests;

evaluating with content delivery service the at least one analytic rule utilizing the state data and the received content requests to determine a presence of advertisement blocking software executing on the one or more computing devices;

identifying with the content delivery service a processing technique to mitigate identification of the advertisement blocking software, wherein the processing technique causes modification of at least one of sequential information or naming information associated with a plurality of encoded segments identified in an initial content manifest;

wherein an on-demand service applies the identified processing technique to encoded advertisement segments identified in the initial content manifest to generate a first processed content manifest, wherein the modification of the sequential information comprises changing timing information assigned to one or more of the encoded advertisement segments to match timing information assigned to requested content; and transmitting with the content delivery service the first processed content manifest to the one or more computing devices in response to the content requests.

6. The computer-implemented method of claim 5, wherein modifying the sequential information further includes modifying the sequential information to correspond to a single definition of sequential information.

7. The computer-implemented method of claim 5, wherein modifying the sequential information further includes generating discontinuities in the sequential information.

8. The computer-implemented method of claim 7, wherein generating discontinuities is based on a determined frequency.

9. The computer-implemented method of claim 5, wherein modifying the naming information includes removing or encrypting at least a portion of naming information associated with at least one encoded advertisement segment identified in the initial content manifest.

10. The computer-implemented method of claim 5, wherein modifying sequential information includes changing programming time stamp information associated with the encoded advertisement segments to match programming time stamp information associated with the requested content.

11. The computer-implemented method of claim 5, wherein modifying sequential information includes replacing programming time stamp information associated with the encoded advertisement segments and programming time stamp information associated with the requested content to a common programming time stamp format.

12. The computer-implemented method of claim 5, wherein the at least one analytic rule corresponds to a consumption rate based on a time between content segment requests, or an identification of a sequence of content segments.

13. The computer-implemented method of claim 5, wherein the at least one analytic rule corresponds to an evaluation of whether a consecutive sequence of content segment requests have been received.

14. The computer-implemented method of claim 5, wherein the at least one analytic rule corresponds to a characterization of volume based on input from an external device.

15. A system to transmit content comprising:
one or more computing devices associated with an on-demand service, wherein the on-demand service is configured to:
   apply a processing technique to at least one encoded advertisement segment identified in an initial content manifest to generate a first processed content manifest, the processing technique configured to mitigate an action performed by a blocking software application executing on one or more computing devices from identifying encoded advertisement segments, the processing technique selected from at least one of modifying sequential information or naming information associated with the encoded advertisement segments, wherein the applied processing technique is identified by a video packaging and origination service that obtains at one analytic rule corresponding to information associated with received content requests and evaluates the at least one analytic rule utilizing data associated with historical receipt of content requests and the received content requests to determine a presence or performance of the blocking software application, wherein the modification of the sequential information comprises changing timing information assigned to one or more of the encoded advertisement segments to match timing information assigned to requested content.

16. The system of claim 15, wherein modifying the sequential information further includes modifying the sequential information to correspond to a single definition of sequential information.

17. The system of claim 15, wherein modifying the sequential information further includes generating discontinuities in the sequential information.

18. The system of claim 15, wherein modifying the naming information includes removing or encrypting at least a portion of naming information associated with at least one encoded advertisement segment identified in the initial content manifest.

19. The system of claim 15, wherein modifying the sequential information includes changing programming time stamp information associated with the encoded advertisement segments identified in the initial content manifest to match programming time stamp information associated with the requested content.

20. The system of claim 15, wherein modifying the sequential information includes replacing programming time stamp information associated with the encoded advertisement segments identified in the initial content manifest and programming time stamp information associated with the requested content to a common programming time stamp format.

* * * * *

UNITED STATES PATENT AND TRADEMARK OFFICE
CERTIFICATE OF CORRECTION

PATENT NO. : 11,350,143 B2
APPLICATION NO. : 17/199840
DATED : May 31, 2022
INVENTOR(S) : Ram et al.

It is certified that error appears in the above-identified patent and that said Letters Patent is hereby corrected as shown below:

In the Drawings

Sheet 12 of 12 (Reference Numeral 1004), (Fig. 10), Line 2, delete "MANFIEST" and insert -- MANIFEST --.

Sheet 12 of 12 (Reference Numeral 1010), (Fig. 10), Line 2, delete "MANFIEST" and insert -- MANIFEST --.

In the Specification

Column 2, Line 4, delete "embodiments." and insert -- embodiments; --.

Column 2, Line 39, delete "("MPEG)" and insert -- ("MPEG") --.

Column 7, Line 67, delete "network°" and insert -- network --.

Column 9, Line 49, line Before "drive" insert -- disk --.

Column 9, Line 50, delete "(SDD)," and insert -- (SSD), --.

Column 10, Line 15 (approx.), after "hard" insert -- disk --.

Column 10, Line 15 (approx.), delete "(SDD)," and insert -- (SSD), --.

In the Claims

Column 27, Line 47, Claim 4, after "one" insert -- of --.

Signed and Sealed this
Twenty-seventh Day of September, 2022

Katherine Kelly Vidal
*Director of the United States Patent and Trademark Office*